(12) United States Patent
Limatoc et al.

(10) Patent No.: US 12,241,494 B2
(45) Date of Patent: *Mar. 4, 2025

(54) MULTI-PIECE BOLTS AND METHODS OF MAKING THE SAME

(71) Applicant: CRUSHLOCK, INC., Chuluota, FL (US)

(72) Inventors: Arnold R. Limatoc, Aiea, HI (US); Joel S. Peck, Kapolei, HI (US); James P. Karins, Chuluota, FL (US)

(73) Assignee: CRUSHLOCK, INC., Chuluota, FL (US)

(*) Notice: Subject to any disclaimer, the term of this patent is extended or adjusted under 35 U.S.C. 154(b) by 754 days.

This patent is subject to a terminal disclaimer.

(21) Appl. No.: 17/398,833

(22) Filed: Aug. 10, 2021

(65) Prior Publication Data

US 2021/0364028 A1  Nov. 25, 2021

Related U.S. Application Data

(63) Continuation of application No. 16/358,466, filed on Mar. 19, 2019, now Pat. No. 11,111,945.

(60) Provisional application No. 62/653,168, filed on Apr. 5, 2018.

(51) Int. Cl.
*F16B 19/00* (2006.01)
*F16B 31/04* (2006.01)
*F16B 39/284* (2006.01)

(52) U.S. Cl.
CPC ............ *F16B 31/04* (2013.01); *F16B 39/284* (2013.01)

(58) Field of Classification Search
CPC .... F16B 31/04; F16B 39/284; F16B 25/0036; F16B 25/0094

USPC ................................................ 411/396, 397
See application file for complete search history.

(56) References Cited

U.S. PATENT DOCUMENTS

| | | | |
|---|---|---|---|
| 259,552 A | 6/1882 | Kingsley |
| 824,983 A | * | 7/1908 | Farrington |
| 915,830 A | 3/1909 | Craven |
| 1,049,765 A | 1/1913 | Reed |
| 1,052,601 A | 2/1913 | Luyties |

(Continued)

FOREIGN PATENT DOCUMENTS

| | | |
|---|---|---|
| GB | 870946 A | 6/1961 |
| GB | 2287764 A | 9/1995 |
| JP | 2005-069254 A | 2/2005 |

OTHER PUBLICATIONS

U.S. Patent and Trademark Office, International Search Report and Written Opinion of International Searching Authority for PCT/US16/44292, mailed Oct. 28, 2016 (14 pages).

(Continued)

*Primary Examiner* — Gary W Estremsky
(74) *Attorney, Agent, or Firm* — Nixon Peabody LLP

(57) ABSTRACT

A bolt includes a threaded shaft and a bolt head. The threaded shaft has a first end, a second opposing end, and an external thread. The first end includes a flared protrusion and the external thread is wrapped about the shaft and extends from the second opposing end to the flared protrusion. The bolt head includes an interior threaded bore for threadingly engaging the external thread of the threaded shaft, a front surface, and an opposing back surface having a recess configured to receive at least a portion of the flared protrusion of the threaded shaft therein.

19 Claims, 14 Drawing Sheets

(56) References Cited

U.S. PATENT DOCUMENTS

| | | |
|---|---|---|
| 1,119,299 A | 12/1914 | Martin |
| 1,406,423 A | 2/1922 | Smith |
| 1,838,605 A | 12/1931 | Youlten |
| 2,222,460 A | 11/1940 | Crowley |
| 2,258,181 A | 10/1941 | Hinds |
| 2,286,336 A | 6/1942 | Brooke |
| 2,318,398 A | 5/1943 | Hungerford |
| 2,320,785 A | 6/1943 | Luce |
| 2,374,241 A | 4/1945 | Simmonds |
| 2,375,325 A | 5/1945 | Robertson |
| 2,529,093 A | 7/1945 | Luce |
| 2,381,110 A | 8/1945 | Chandler |
| 2,389,377 A | 11/1945 | Manning |
| 2,390,726 A | 12/1945 | Mitchell |
| 2,564,645 A | 8/1951 | Johnson |
| 2,927,495 A | 3/1960 | Barwood |
| 3,129,742 A | 4/1964 | Faroni |
| 3,440,922 A | 4/1969 | Cohen |
| 3,491,630 A | 1/1970 | Mielke |
| 3,522,830 A | 8/1970 | Blizard |
| 3,606,357 A | 9/1971 | Yonkers |
| 3,670,618 A | 6/1972 | Jellison |
| 3,672,334 A | 6/1972 | Scheppele |
| 3,757,630 A | 9/1973 | Dahl |
| 3,882,752 A | 5/1975 | Gutshall |
| 4,019,550 A | 4/1977 | DeHaitre |
| 4,206,060 A | 6/1980 | Yamamoto |
| 4,749,321 A | 6/1988 | Knohl |
| 4,946,126 A | 8/1990 | Williams |
| 5,147,093 A * | 9/1992 | Tisdale ............... A63F 9/12 411/397 |
| 5,156,509 A | 10/1992 | Wu |
| 5,222,851 A | 6/1993 | Dickerson |
| 5,454,675 A | 10/1995 | DeHaitre |
| 5,518,351 A | 5/1996 | Peil |
| 5,622,464 A | 4/1997 | Dill |
| 5,647,710 A | 7/1997 | Cushman |
| 5,927,918 A | 7/1999 | Burger |
| 6,019,556 A | 2/2000 | Hess |
| 6,132,153 A | 10/2000 | LeVey |
| 6,196,781 B1 * | 3/2001 | Yang ............... F16B 33/00 411/397 |
| 6,244,807 B1 | 6/2001 | Garcia |
| 6,443,680 B1 | 9/2002 | Bodin |
| 6,874,985 B2 * | 4/2005 | Hein ............... F16B 5/02 411/374 |
| 6,881,019 B2 | 4/2005 | Wolf |
| 8,087,863 B2 | 1/2012 | Flaig |
| 8,192,302 B2 * | 6/2012 | Knutson ............ A63B 53/0466 473/335 |
| 8,753,227 B1 * | 6/2014 | Cackett .............. A63B 53/06 411/397 |
| 8,888,426 B2 | 11/2014 | Diehl |
| 2002/0106259 A1 * | 8/2002 | Kaufman ............. F16B 33/006 411/396 |
| 2010/0068004 A1 | 3/2010 | Mair |
| 2014/0017028 A1 | 1/2014 | McKinlay |
| 2014/0286727 A1 | 9/2014 | Limatoc |

OTHER PUBLICATIONS

U.S. Patent and Trademark Office, International Search Report and Written Opinion of International Searching Authority for PCT/US14/041272, mailed Jun. 6, 2014 (10 pages).

International Searching Authority, International Search Report and Written Opinion in International Application No. PCT/US18/13142, mailed Mar. 28, 2018 (10 pages).

* cited by examiner

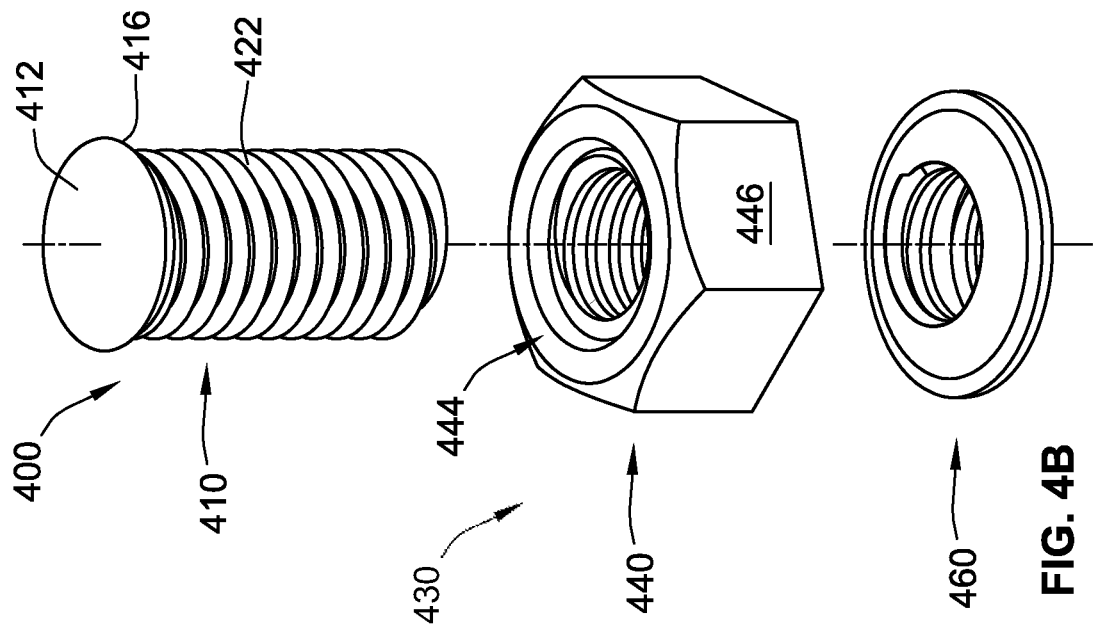
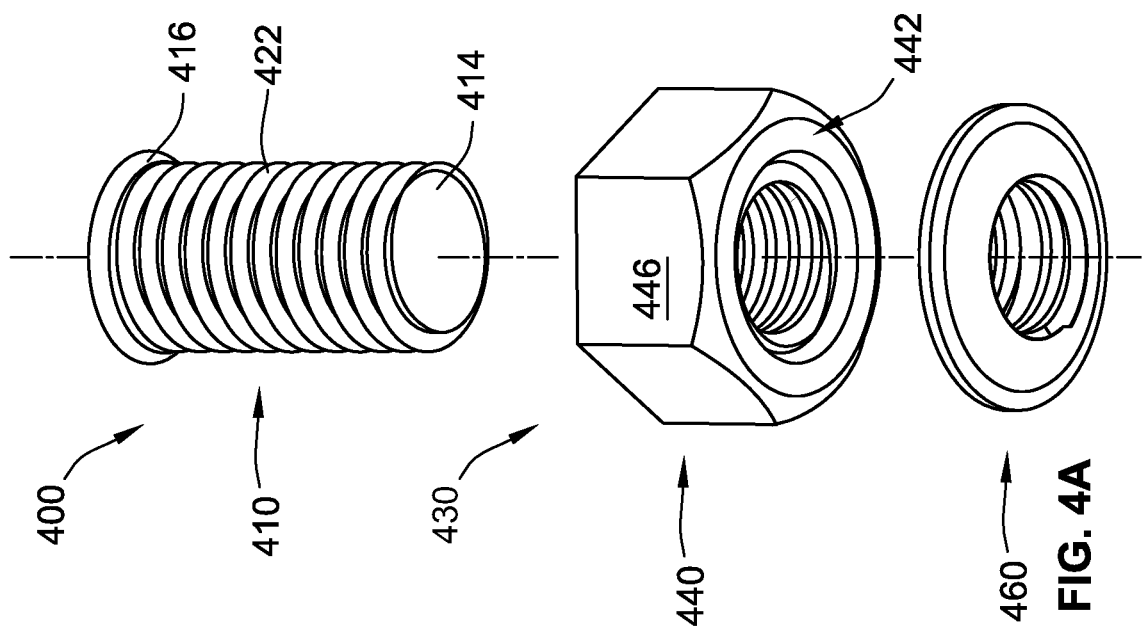

MULTI-PIECE BOLTS AND METHODS OF MAKING THE SAME

CROSS-REFERENCE TO RELATED APPLICATIONS

This application is a continuation of application Ser. No. 16/358,466, filed on Mar. 19, 2019, now allowed, which claims the benefit of and priority to U.S. Provisional Application No. 62/653,168, filed Apr. 5, 2018, each of which is hereby incorporated by reference herein in its entirety.

TECHNICAL FIELD

The present disclosure relates generally to bolts. More specifically, the present disclosure relates to multi-piece bolts and methods of making and using the same.

BACKGROUND

In many applications, it is desirable to have a threaded nut fastened on a threaded bolt that can withstand high torques and correspondingly high preloads without the bolt/nut fastener failing (e.g., shearing or popping off of the bolt head). Conventionally, a nut is threaded onto a threaded shaft of the bolt, which applies a preload force to a joint. The joint typically includes two items (e.g., plates) being secure or bolted together by the bolt/nut fastener. The preload force causes the bolt shaft to stretch along its central axis and also holds and/or bolts the objects together (e.g., by way of the bolt head and nut exerting opposing clamp forces on the objects). In addition, a rotational torque is applied to the bolt, the nut, or both to secure the object(s) between the bolt/nut. However, in standard bolts, preload and torsional forces are concentrated at the point where the shaft of the bolt meets the head of the bolt, which can be the weakest point of the bolt and most susceptible to failing.

The present disclosure is directed to solving these and other problems by providing a multi-piece bolt that can be torqued to apply relatively higher preload forces compared to a standard bolt.

SUMMARY

According to some implementations of the present disclosure, a bolt includes a threaded shaft and a bolt head. The threaded shaft has a first end, a second opposing end, and an external thread. The first end includes a flared protrusion and the external thread is wrapped about the shaft and extends from the second opposing end to the flared protrusion. The bolt head includes an interior threaded bore for threadingly engaging the external thread of the threaded shaft, a front surface, and an opposing back surface having a recess configured to receive at least a portion of the flared protrusion of the threaded shaft therein.

According to some implementations of the present disclosure, a method for making a bolt includes providing a shaft having a first end and a second opposing end, forming a flared protrusion at the first end of the shaft, forming a thread on the shaft such that the thread extends from the second end to the flared protrusion, threadingly engaging a bolt head onto the thread of the shaft at the second opposing end of the shaft, the bolt head including (i) an interior threaded bore, (ii) a front surface, and (iii) an opposing back surface having a recess, rotating the bolt head relative to the shaft such that bolt head translates along the shaft towards the first end; and continuing to rotate the bolt head until the flared protrusion formed in the shaft is received within the recess of the bolt head.

According to some implementations of the present disclosure, a bolt includes a threaded shaft and a bolt head. The threaded shaft has a first end, a second opposing end, an external thread, and a flared protrusion, the external thread being wrapped about the shaft and extending from the second opposing end to the flared protrusion. The bolt head includes a main body and a deformable body. The main body has (i) an interior threaded bore, (ii) a front surface having a first recess, and (iii) an opposing back surface having a second recess configured to receive at least a portion of the flared end of the threaded shaft therein. The deformable body has an interior threaded bore and an outer flange, the outer flange being coupled to the front surface of the main body such that a relief space is formed between the deformable body and the first recess of the main body.

According to some implementations of the present disclosure, a method of making a bolt includes providing a shaft having a first end and a second opposing end; forming a flared protrusion at the first end of the threaded shaft; forming a thread on the shaft such that the thread extends from the second end to the flared protrusion; threadingly engaging a bolt head onto the thread of the shaft at the second opposing end of the shaft, the bolt head including a main body, a deformable body, and a relief space formed between a first recess of the main body and a flared end of the deformable body; rotating the bolt head relative to the shaft such that the bolt head translates along the shaft towards the first end; and continuing to rotate the bolt head until the flared protrusion formed in the shaft is received within a second recess formed in a back surface of the main body of the bolt head, thereby forming the bolt head.

According to some implementations of the present disclosure, a method of securing a bolt to an object with a nut, the bolt comprising a threaded shaft and a bolt head having a main body and a deformable body, the method includes positioning the threaded shaft through an opening in the object such that a portion of the threaded shaft protrudes from the opening; threading the nut onto the portion of the threaded shaft protruding from the opening by rotating the nut in a first rotational direction, thereby causing the nut to move axially in a first direction towards a first surface of the object; causing a front surface of the nut to abut the first surface of the object and causing a front surface of the deformable body of the bolt head to abut a second opposing surface of the object by: (i) continuing to thread the nut onto the portion of the threaded shaft; (ii) rotating the bolt in a second opposing rotational direction, or (iii) a combination of (i) and (ii); with the front surface of the nut abutting the first surface of the object and with the front surface of the deformable body abutting the second opposing surface of the object: (a) applying a first rotational torque in the first rotational direction to the nut; (b) applying a second rotational torque in the second rotational direction to the bolt, or (c) a combination of (a) and (b); the application of the first rotational torque, the application of the second rotational torque, or the application of both the first and second rotational torques causing the deformable body to deform, thereby entering at least a portion of a relief space formed between the deformable body and the main body of the bolt head.

The above summary is not intended to represent each embodiment or every aspect of the present invention. Addi-

BRIEF DESCRIPTION OF THE DRAWINGS

FIG. 4A is an exploded bottom perspective view of a bolt according to some implementations of the present disclosure;

FIG. 4B is an exploded top perspective view of the bolt of FIG. 4A;

Figure 1B:
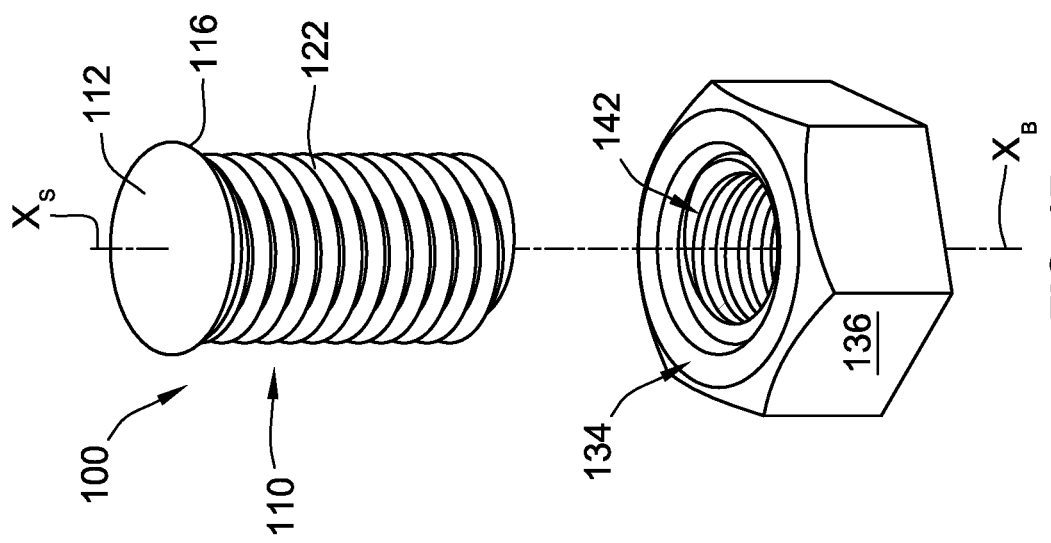
FIG. 1B is an exploded top perspective view of the bolt of FIG. 1A.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Figure 1A:
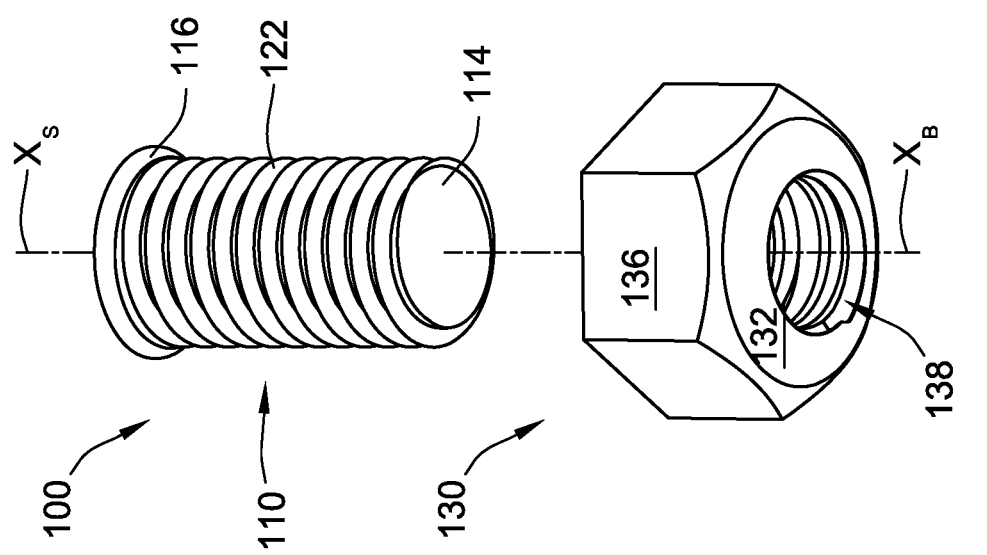
FIG. 1A is an exploded bottom perspective view of a bolt according to some implementations of the present disclosure.
Figure 1C:
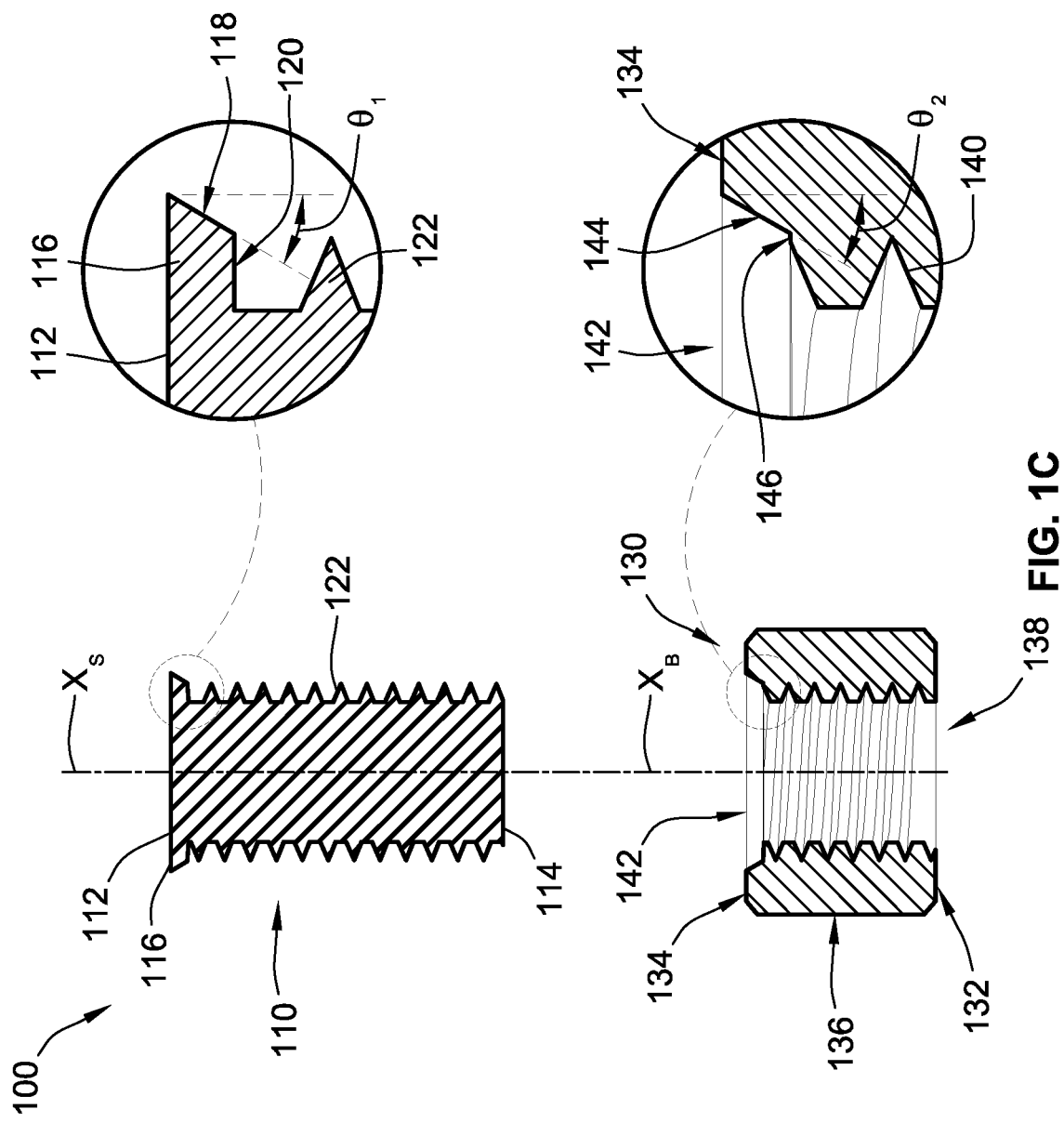
FIG. 1C is an exploded side cross-sectional view of the bolt of FIG. 1A.
Figure 2B:
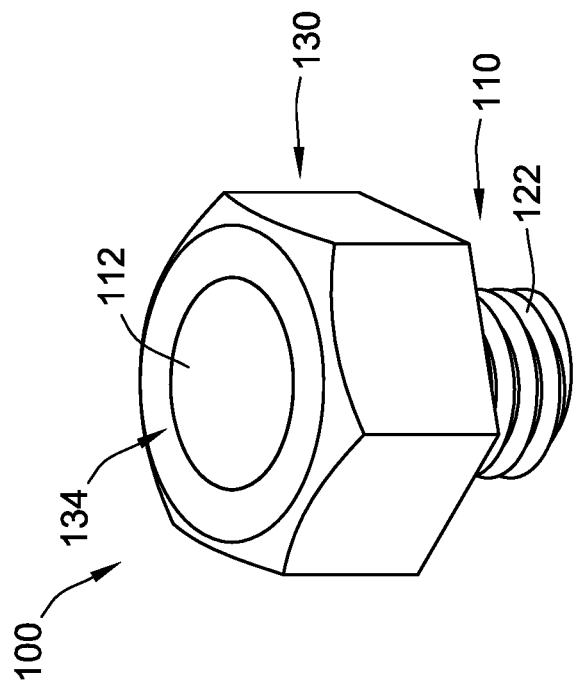
FIG. 2B is an assembled top perspective view of the bolt of FIG. 2A.
Figure 2A:
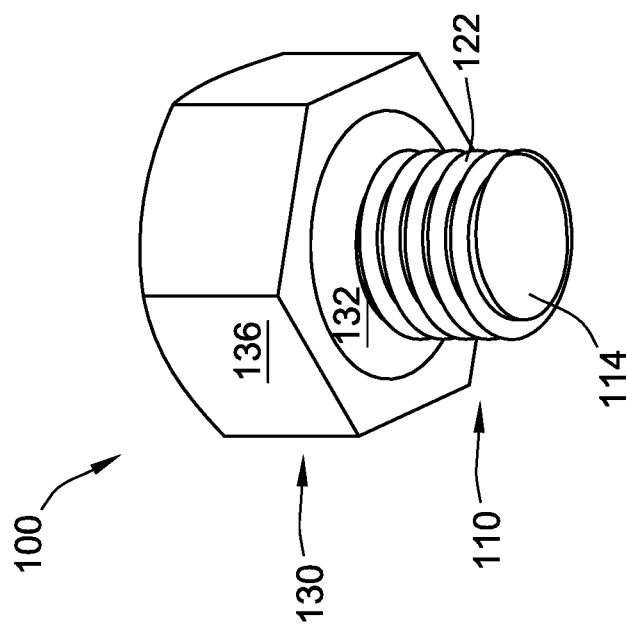
FIG. 2A is an assembled bottom perspective view of the bolt of FIG. 1A.
Figure 2C:
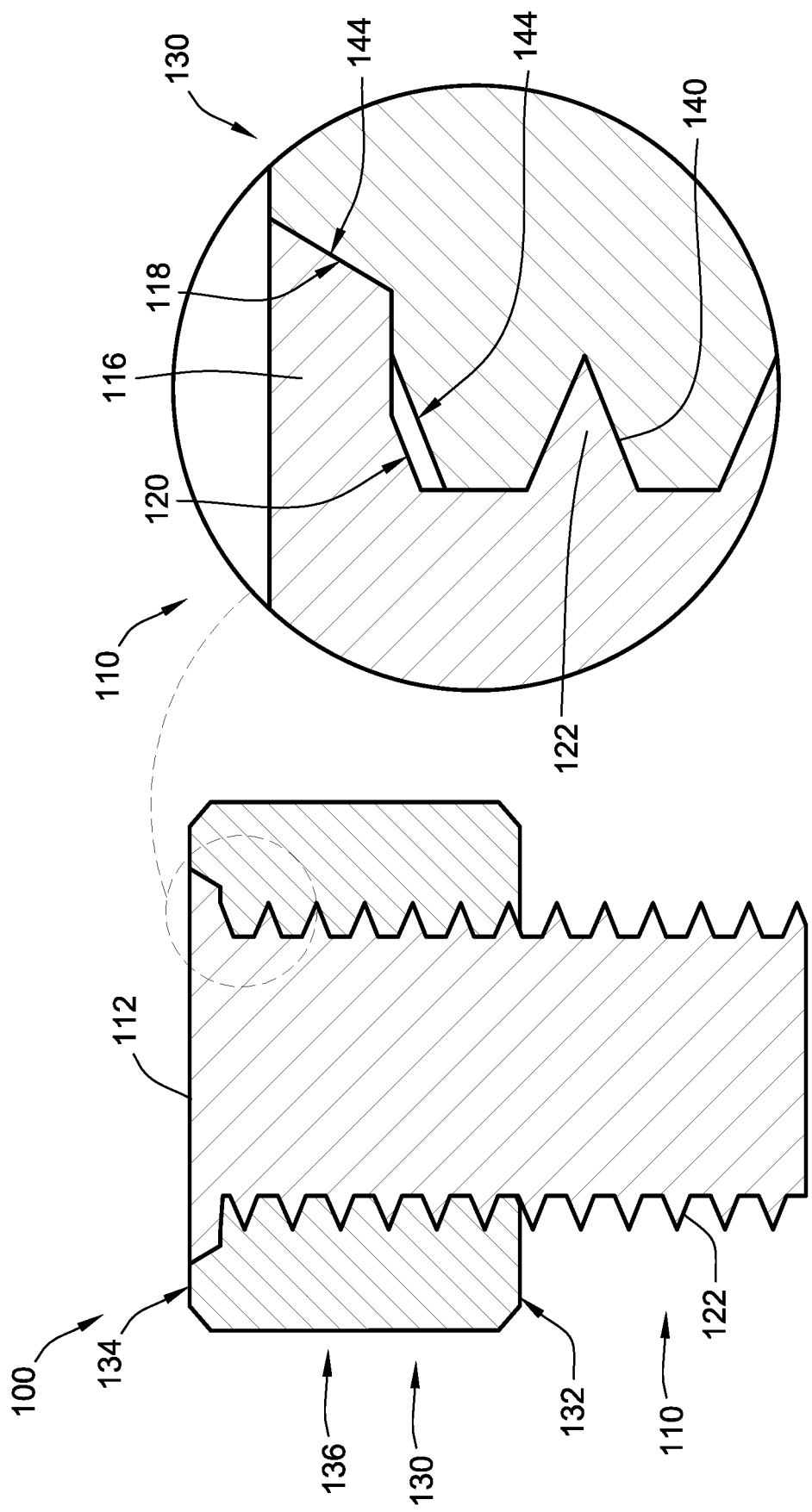
FIG. 2C is an assembled cross-sectional view of the bolt of FIG. 2A.
Figure 3A:
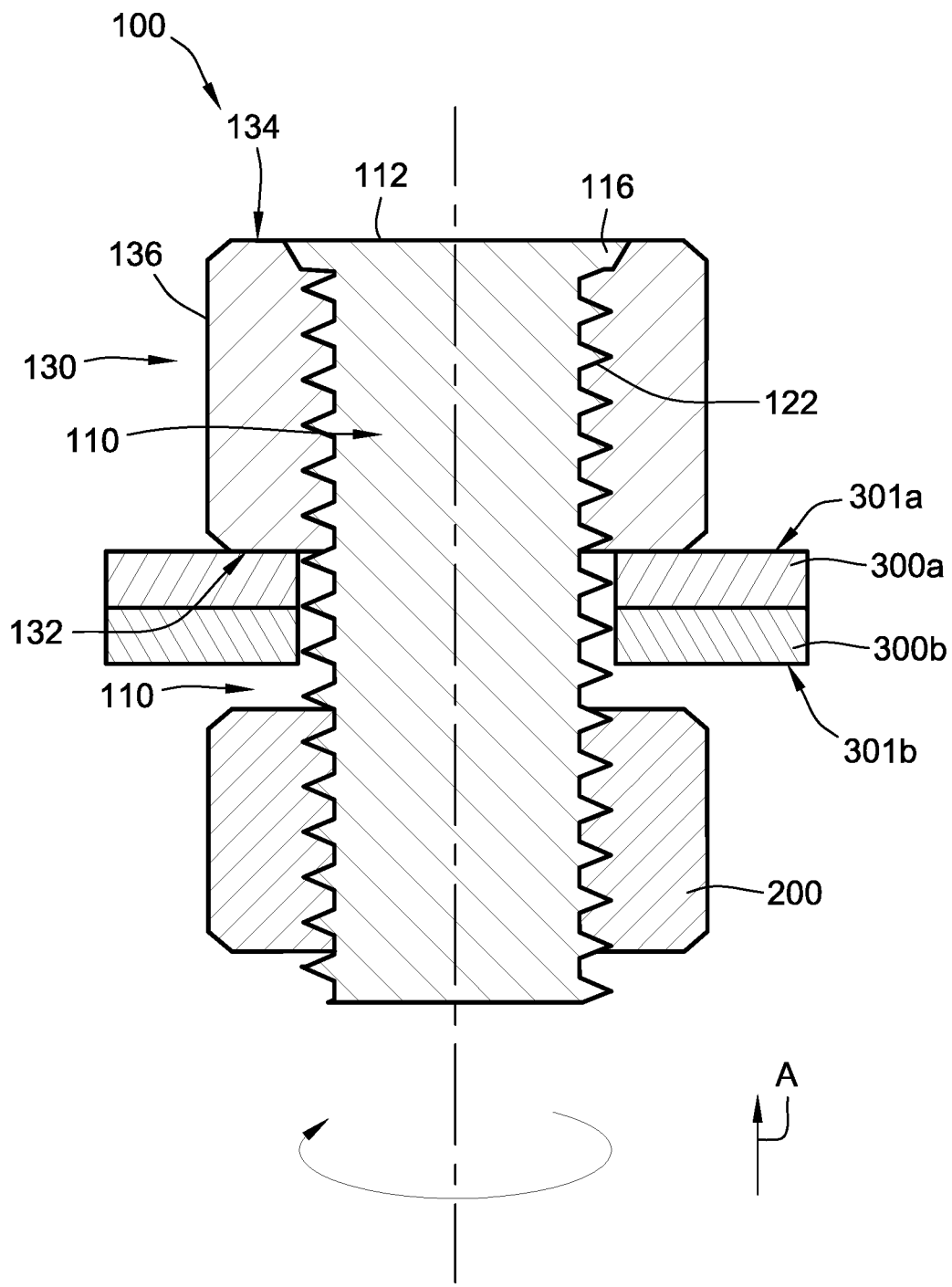
FIG. 3A is a front cross-sectional view of the bolt of FIG. 2A loosely positioned through an object and loosely threadingly engaged with a nut prior to the nut being torqued according to some implementations of the present disclosure.
Figure 3B:
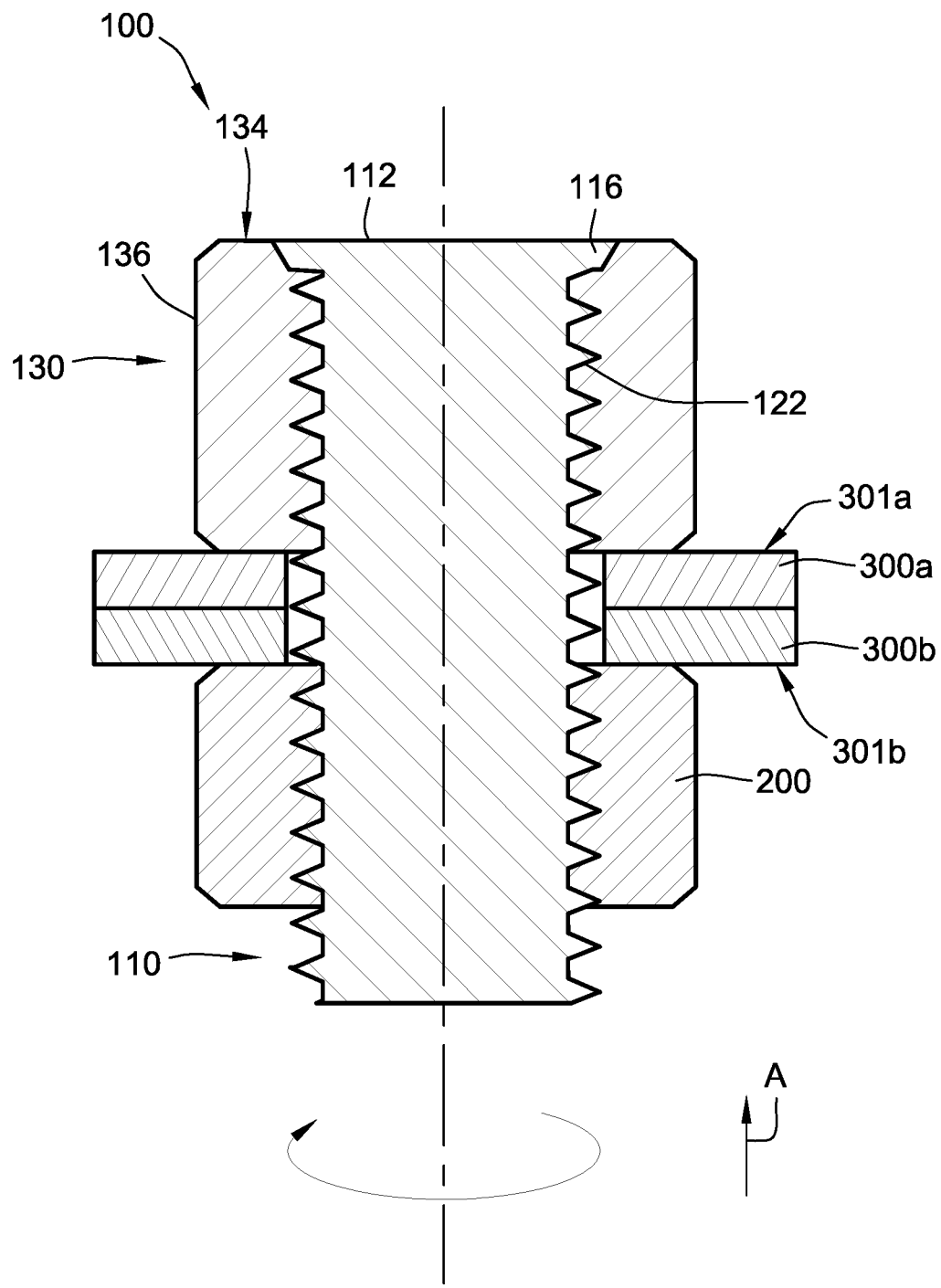
FIG. 3B is a front cross-sectional view of the bolt of FIG. 3A threadingly engaged with the nut such that the object is secured therebetween according to some implementations of the present disclosure.

Referring generally to FIGS. 1A-3B, a bolt 100 includes a threaded shaft 110 and a bolt head 130. As shown in FIGS. 1A-1C, the bolt 100 is exploded or in a pre-assembled configuration where the threaded shaft 110 is separated from the bolt head 130. As shown in FIGS. 2A-2D, the bolt 100 is in its assembled configuration where the bolt head 130 is threadingly coupled to the threaded shaft 110, thereby forming the bolt 100. As shown in FIGS. 3A-3B, the bolt 100 can be used in conjunction with a nut 200 to securely clamp objects 300a, 300b.

The bolt 100 can be made from one or more materials, such as, for example, brass, bronze, aluminum and aluminum alloys, steel, stainless steel (e.g., type 304 stainless steel, grade 2, super alloy), titanium, ferrous metals, metal alloys, plastic, nylon, etc. The threaded shaft 110 and the bolt head 130 are made from the same material (e.g., steel). Alternatively, the threaded shaft 110 is made from a first material that has a first set of properties and the bolt head 130 is made from a second material that has a second set of properties that is different than the first set of properties. For example, in such alternatives, the second material may be relatively more ductile than the first material.

Referring generally to FIGS. 1A-1C, the threaded shaft 110 is a generally cylindrical rod having a first end 112 (FIG. 1B), a second opposing end 114 (FIG. 1A), a generally annular flared protrusion 116, and an external thread 122 wrapped therearound. As described in further detail below, the flared protrusion 116 is received within a recess 142 of the bolt head 130 (FIG. 1C) during assembly of the bolt 100. As best shown in FIG. 1C, the flared protrusion 116 is inwardly tapered in a distal direction from the first end 112 of the threaded shaft 110 towards the second opposing end 114.

As best shown in FIG. 1C, the flared protrusion 116 includes an inclined surface 118 and a shoulder 120. The inclined surface 118 of the flared protrusion 116 is inwardly tapered by a first angle $\theta_1$ relative to a central axis $X_s$ of the threaded shaft 110. As shown, the first angle $\theta_1$ is about 30 degrees relative to the central axis $X_s$. Alternatively, the first angle $\theta_1$ of the inclined surface 118 of the flared protrusion 116 can be between about 0 degrees and about 90 degrees. More preferably, the first angle $\theta_1$ of the inclined surface 118 can range from about 10 degrees to about 75 degrees, and can be, for example, 10 degrees, 15 degrees, 25 degrees, 30 degrees, 45 degrees, 60 degrees, 75 degrees. The inclined surface 118 inwardly tapers towards the central axis $X_s$ of the threaded shaft 110 until it intersects with the shoulder 120. As shown, the shoulder 120 is generally horizontal (e.g., at an angle of about 90 degrees relative to the central axis $X_s$ of the threaded shaft 110).

As best shown in FIG. 1B, the flared protrusion 116 extends circumferentially relative to an outer diameter of the threaded shaft 110. As shown, the flared protrusion 116 extends circumferentially around 100 percent of the outer diameter of the threaded shaft 110. Alternatively, in some implementations, the flared protrusion 116 extends circumferentially around less than 100 percent of the outer diameter of the threaded shaft 110 such that the flared protrusion 116 (e.g., 90 percent, 75 percent, 60 percent, 45 percent, 30 percent, etc.) In other implementations, rather than including a single flared protrusion 116, the threaded shaft 110 can include a plurality of flared protrusions (e.g., two flared protrusions, four flared protrusions, eighth flared protrusions, etc.) extending from an outer diameter of the threaded shaft 110. In such implementations, the plurality of flared protrusions (not shown) can be spaced evenly relative to one another around the outer diameter of the threaded shaft 110, or the plurality of flared protrusions can be unevenly spaced relative to one another.

The maximum outer diameter of the generally annular flared protrusion 116 is about 130 percent of the maximum outer diameter of the external thread 122. Alternatively, the maximum outer diameter of the flared protrusion 116 can be between about 110 percent to about 300 percent of the outer diameter of the maximum outer diameter of the external thread 122. More preferably, the maximum outer diameter of the flared protrusion 116 is between about 120 percent to about 150 percent of the maximum outer diameter of the external thread 122. In some implementations, the maximum outer diameter of the flared protrusion 116 can be determined as a function of the diameter of the mating bolt head. Similarly, in some implementations, the maximum outer diameter of the bolt head 130 is about 150 percent of the maximum outer diameter of the generally annular flared protrusion 116. Alternatively, the maximum outer diameter of bolt head 130 can be between about 110 percent to about 200 percent of the maximum outer diameter of the flared protrusion 116. More preferably, the maximum outer diameter of bolt head 130 can be in the range from about 130 percent to about 170 percent of the maximum outer diameter of the flared protrusion 116.

The external thread 122 is formed on an outer surface of the threaded shaft 110 and extends generally between the second end 114 of the threaded shaft 110 and the shoulder 120 of the flared protrusion 116. As described in further detail below, the external thread 122 engages an internal threaded bore 138 of the bolt head 130 during assembly of the bolt 100.

Referring generally to FIGS. 1A-1C, the bolt head 130 has a front or leading surface 132, an opposing back or trailing surface 134, an outer surface 136, and an inwardly tapered back surface 144 (FIG. 1C). The outer surface 136 is sized and shaped such that the bolt head 130 has a generally hexagonal outer cross-section, but other shapes for the outer surface 136 are contemplated (e.g., circle, square, oval, triangle, rectangle, polygon, etc., or any combination thereof) such that, as described in further detail below, a tool can engage the bolt head 130 during assembly of the bolt 100 and/or installation of the bolt 100 (e.g., the tool can cause the bolt head 130 to rotate relative to the threaded shaft 110).

As shown in FIG. 1C, the tapered back surface 144 of the bolt head 130 defines a recess 142. The tapered back surface 144 is inwardly tapered from the opposing back surface 134 of the bolt head 130 towards the front surface 132. More specifically, the tapered back surface 144 is inwardly tapered from the opposing back surface 134 towards the front surface 132 by a second angle $\theta_2$ relative to a central axis $X_b$ of the bolt head 130. As shown, the second angle $\theta_2$ is about 30 degrees relative to the central axis $X_b$ of the bolt head 130. Alternatively, the second angle $\theta_2$ of the tapered back surface 144 can be between about 0 degrees and about 90 degrees. More preferably, the second angle $\theta_2$ of the tapered back surface 144 is between about 10 degrees and about 75 degrees. As shown, the tapered back surface 144 inwardly tapers towards the central axis $X_b$ of the bolt head 130 until it intersects with a shoulder 146. The shoulder 146 is generally horizontal (e.g., at an angle of about 90 degrees relative to the central axis $X_b$ of the bolt head 130). As described in detail below, the tapered back surface 144 abuts the inclined surface 118 of the flared protrusion 116 and the shoulder 146 abuts the shoulder 120 when the bolt 100 is in the assembled configuration (FIGS. 2A-2C).

As best shown in FIG. 1C, the bolt head 130 also includes an interior threaded bore 138 that extends between the front surface 132 of the bolt head 130 and the shoulder 146 of the recess 142. The interior threaded bore 138 is sized and shaped to receive at least a portion of the threaded shaft 110 therein and includes an internal thread 140. The internal thread 140 engages the external thread 122 of the threaded shaft 110 during assembly of the bolt 100 (FIGS. 2A-2C).

As shown, the external thread 122 of the threaded shaft 110 and the internal thread 140 of the bolt head 130 are each helical. Alternatively, the external thread 122 and/or the internal thread 140 can include continuous or discontinuous thread segments, single or multiple leads or threads, or any combination thereof. Further, while a certain sized thread having a thread pitch and a thread depth is shown, the external thread 122 and/or the internal thread 140 can have any pitch and any depth (e.g., a unified or metric thread, a square thread, an ACME thread, a buttress thread, etc.)

According to some implementations, a height of the bolt head 130 can be, for example, the height of a standard (e.g., ASTM or SAE) bolt-head and a height of the flared protrusion 116 (i.e., a distance between the first end 112 of the threaded shaft 110 and the shoulder 120 of the flared protrusion) can range between about 5 percent to about 75 percent of the bolt head 130. More generally, the size of the bolt head 130 can be selected for a specific application (e.g., based on the desired installation torque). Further, while a certain length of the threaded shaft 110 is shown, the threaded shaft 110 can have any length (e.g., between about 0.25 inches or shorter and about 100 inches or longer, between about 1 inch and about 10 inches, about 4.25 inches, etc.). More generally, the size (e.g., diameter and/or length) of the threaded shaft 110 can be selected for a specific application.

Referring generally to FIGS. 2A-2C, in the assembled configuration, the bolt head 130 is threadingly coupled to the threaded shaft 110 to form the bolt 100. As best shown in FIGS. 2B and 2C, the first end 112 of the threaded shaft 110 is co-planar (e.g., flush) with the opposing back surface 134 of the bolt head 130. Further, as best shown in FIG. 2C, the first angle $\theta_1$ of the inclined surface 118 of the flared protrusion 116 is substantially equal to the second angle $\theta_2$ of the tapered back surface 144 that defines the recess 142. As a result, the tapered back surface 144 is co-planar and/or coincident with (e.g., abuts) the inclined surface 118 of the flared protrusion 116, and the shoulder 120 of the flared protrusion 116 is co-planar and/or coincident with (e.g., abuts) the shoulder 146 of the recess 142. As described further below, this contact prevents the bolt head 130 from translating along the threaded shaft 110 beyond the first end 112 during assembly and/or installation of the bolt 100.

To assemble the bolt 100 from its unassembled or exploded state (FIGS. 1A-1C) into its assembled state (FIG. 2A-2C), the bolt head 130 is threaded onto the second opposing end 114 of the threaded shaft 110 such that internal thread 140 of the interior threaded bore 138 engages the external thread 122 of the threaded shaft 110. The bolt head 130 is then rotated (e.g., using a tool that engages the outer surface 136 of the bolt head) in a first rotational direction (e.g., clockwise) such that the bolt head 130 translates along the threaded shaft 110 towards the first end 112. Rotation of the bolt head 130 in the first rotational direction continues until the flared protrusion 116 of the threaded shaft 110 is received within the recess 142 of the bolt head 130. Contact between the tapered back surface 144 defining the recess 142 and the inclined surface 118 of the flared protrusion 116 inhibits further translation of the bolt head 130 beyond the first end 112 of the threaded shaft 110.

In some implementations, assembly of the bolt 100 further includes permanently and/or non-rotationally attaching/fixing the bolt head 130 to the threaded shaft 110, after assembly (e.g., as shown in FIGS. 2A-2C), via welding, soldering, gluing, sonic-welding, or any combination of attachment mechanisms such that the bolt head 130 and threaded shaft 110 cannot rotate (e.g., about the central axis $X_s$ of the threaded shaft 110) relative to one another. For example, the bolt head 130 can be heat welded to the first end 112 of the threaded shaft 110 by placing a coil (not shown) on the first end 112 of the threaded shaft and/or the opposing back surface 134 of the bolt head 130 and heat welding the threaded shaft 110 to the bolt head 130. In another example, an adhesive (e.g., friction bearing sealer) is applied to the threaded shaft 110 (e.g., the external thread 122, the flared protrusion 116, or both) and/or the bolt head 130 (e.g., the recess 142 and/or the interior threaded bore 138) prior to and/or during the threading of the bolt head 130 onto the threaded shaft 110.

As described above, in some implementations, the first angle $\theta_1$ of the inclined surface 118 of the flared protrusion 116 and the second angle $\theta_2$ of the tapered back surface 144 of the recess 142 can each be about 0 degrees (e.g., such that the inclined surface 118 and the tapered back surface 144 are generally vertical). In such implementations, rather than being inwardly tapered, the flared protrusion 116 has a generally cylindrical shape and the recess 142 is counterbored into the bolt head 130 and receives the flared protrusion 116 therein. Alternatively, in other implementations, the flared protrusion 116 does not include the shoulder 120 and the recess 142 does not include the shoulder 146. Rather, in such implementations, the flared protrusion 116 has a conical shape and the recess 142 is countersunk into the bolt head 130 and receives the generally conical flared protrusion 116 therein.

In some implementations, the first angle $\theta_1$ of the inclined surface 118 of the flared protrusion 116 can be different than the second angle $\theta_2$ of the tapered back surface 144 of the recess 142. For example, the second angle $\theta_2$ of the tapered back surface 144 can be greater than the first angle $\theta_1$ of the inclined surface 118. In such implementations, the tapered back surface 144 causes at least a portion of the flared protrusion 116 to deform during the threading the bolt head 130 onto the threaded shaft 110. This deformation aids in creating a spring bias between the flared protrusion 116 and the recess 142, which aids in permanently and/or non-rotationally attaching/fixing the bolt head 130 to the threaded shaft 110.

While the recess 142 defined by the tapered rear surface 142 is shown as being sized and shaped such that the inclined surface 118 of the flared protrusion 116 contacts the tapered back surface 144 when the bolt 100 is assembled, alternatively, a diameter of the recess 142 can be larger than an outer diameter of the generally annular flared protrusion 116. In such implementations, a gap (not shown) is formed between the tapered back surface 144 and the inclined surface 118 of the flared protrusion 116 when the bolt head 130 is threaded onto the threaded shaft 110 such that the opposing back surface 134 of the bolt head 130 is co-planar and/or coincident with (e.g., abuts) the first end 112 of the threaded shaft 110. The gap can be filled an adhesive (e.g., friction bearing sealer) or filler metal during welding to aid in permanently and/or non-rotationally attaching/fixing the bolt head 130 to the threaded shaft 110.

Referring to FIGS. 3A and 3B, a method of securing the bolt 100 with a nut 200 to objects 300a, 300b is described. Initially, the threaded shaft 110 of the bolt 100 is positioned through an opening in objects 300a, 300b such that a portion of the threaded shaft 110 protrudes from the opening and such that the front surface 132 of the bolt head 130 abuts a surface 301a of the object 300a (FIG. 3A). Then, the nut 200 is threaded onto the portion of the threaded shaft 110 protruding from the opening by rotating the nut in a first rotational direction (as shown in FIGS. 3A and 3B as being clockwise, but could be counterclockwise in other implementations). This rotation of the nut 200 causes the nut 200 to move axially in the direction of arrow A towards a surface 301b of the object 300b and towards the bolt head 130 of the bolt 100. The nut 200 is continued to be rotated on the portion of the threaded shaft 110 until a front surface of the nut 200 abuts and/or first contacts the surface 301b of the object 300b (FIG. 3B). As such, the front surface 132 of the bolt head 130 abuts and/or is snug against the surface 301a of the object 300a and the nut 200 abuts and/or is snug against the surface 301b of the object 300b as shown in FIG. 3B (i.e., prior to torqueing).

Then, rotational torque is applied to the bolt head 130 of the bolt 100 and/or the nut 200 (e.g., using one or more tools and/or one or more torque wrenches). In some implementations, the bolt head 130 of the bolt 100 is held generally stationary (e.g., via a tool) and a rotational torque is applied to the nut 200 in a rotational direction (e.g., clockwise), thereby torqueing the bolt 100. In other implementations, the nut 200 is generally held stationary (e.g., via a tool) and a rotational torque is applied to the bolt head 130 of the bolt 100 in a rotational direction (e.g., counterclockwise), thereby torqueing the bolt 100.

The torqueing of the bolt 100 described above causes both a torsional (rotational) force and an axial (clamping) force on the bolt 100. The torsional force is distributed towards the opposing back surface 134 of the bolt head 130. The torsional stress experienced by the bolt 100 as a result of this torsional force is proportional to the diameter of the bolt 100. As described above, the diameter of the bolt head 130 is greater than the diameter of the threaded shaft 110 (e.g., the outer diameter is of the bolt head 130 is about twice as large as the outer diameter of the threaded shaft 110). Thus, advantageously, when torsional force is distributed towards the opposing back surface 134 of the bolt head 130, the torsional force is distributed over a larger area, which reduces the torsional stress experienced by the bolt 100. In this manner, the torsional stress experienced by the bolt 100 for a given torsional force is reduced relative to the torsional stress experienced by a standard bolt in which the torsional force is distributed at a junction between its threaded shaft and bolt head.

Similarly, torqueing of the bolt 100 causes the axial force to be applied to the bolt head 130 in the direction of arrow A. This axial force is transferred from the bolt head 130 to the threaded shaft 110. More specifically, the bolt head 130 carries the axial force on the internal thread 140, which exerts an axial force along the corresponding external thread 122 of the threaded shaft 110 to which it is threadingly coupled. The stress caused by the axial force is distributed along an axial length of the threaded shaft 110, meaning that the axial stress at any given point along the threaded shaft 110 is reduced. Accordingly, the failure point of the bolt 100 corresponds to the axial strength of the threaded shaft 110 (i.e., how much the threaded shaft 110 can be strained/stretched before failure).

Figure 4C:
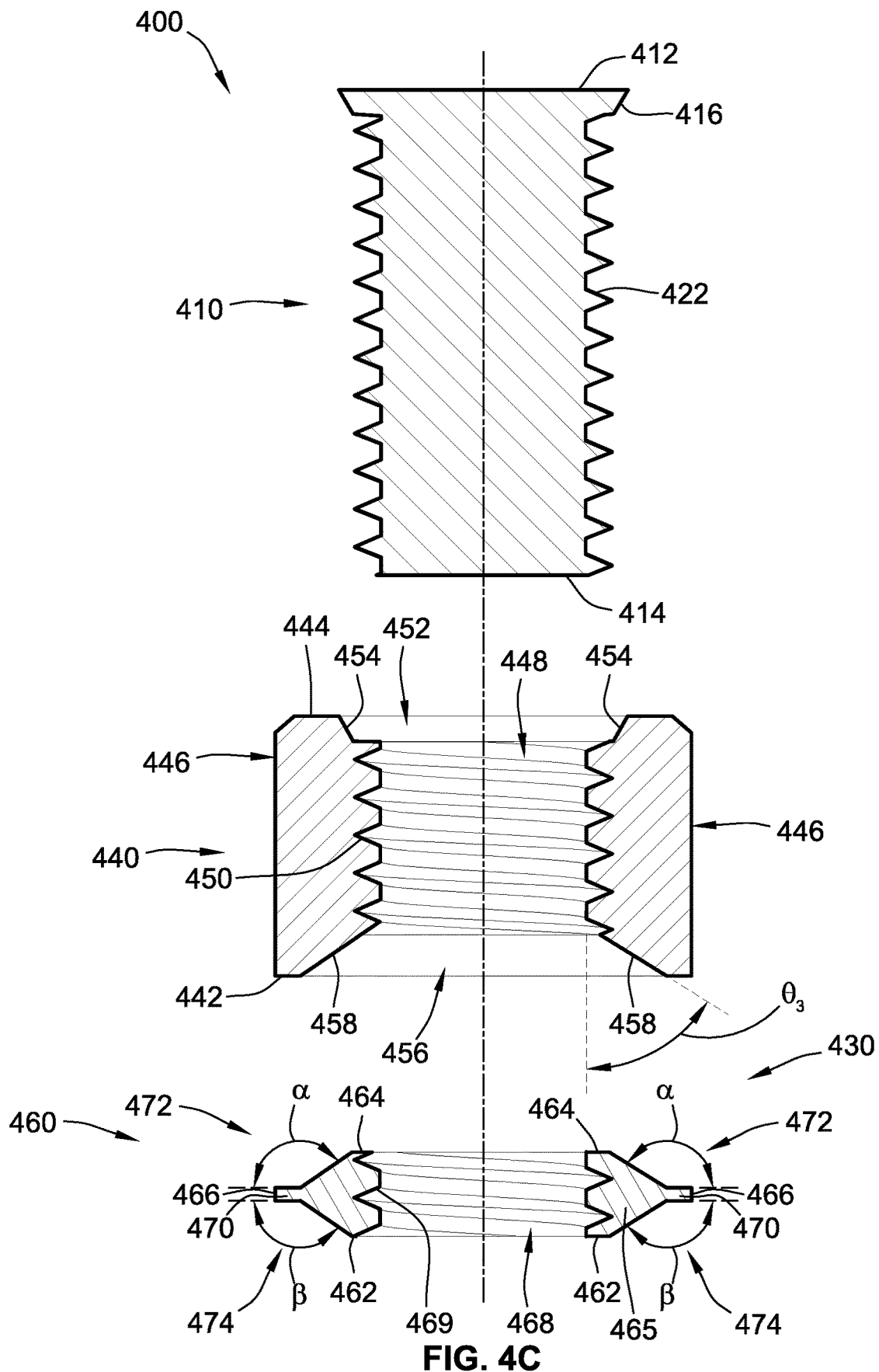
FIG. 4C is exploded side cross-sectional view of the bolt of FIG. 4A.
Figure 5B:
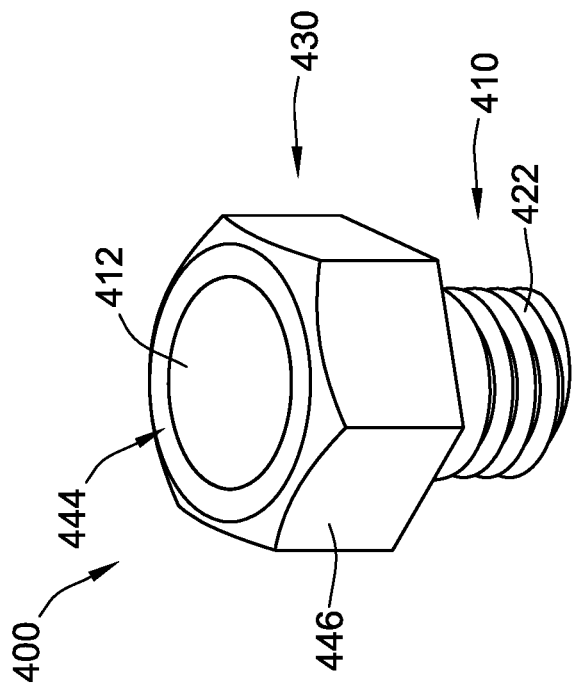
FIG. 5B is an assembled bottom perspective view of the bolt of FIG. 5A.
Figure 5A:
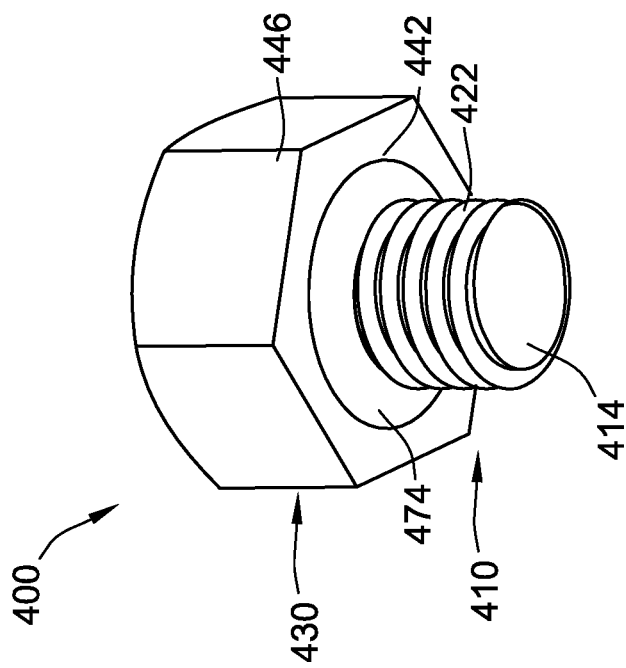
FIG. 5A is an assembled top perspective view of the bolt of FIG. 4A.
Figure 5C:
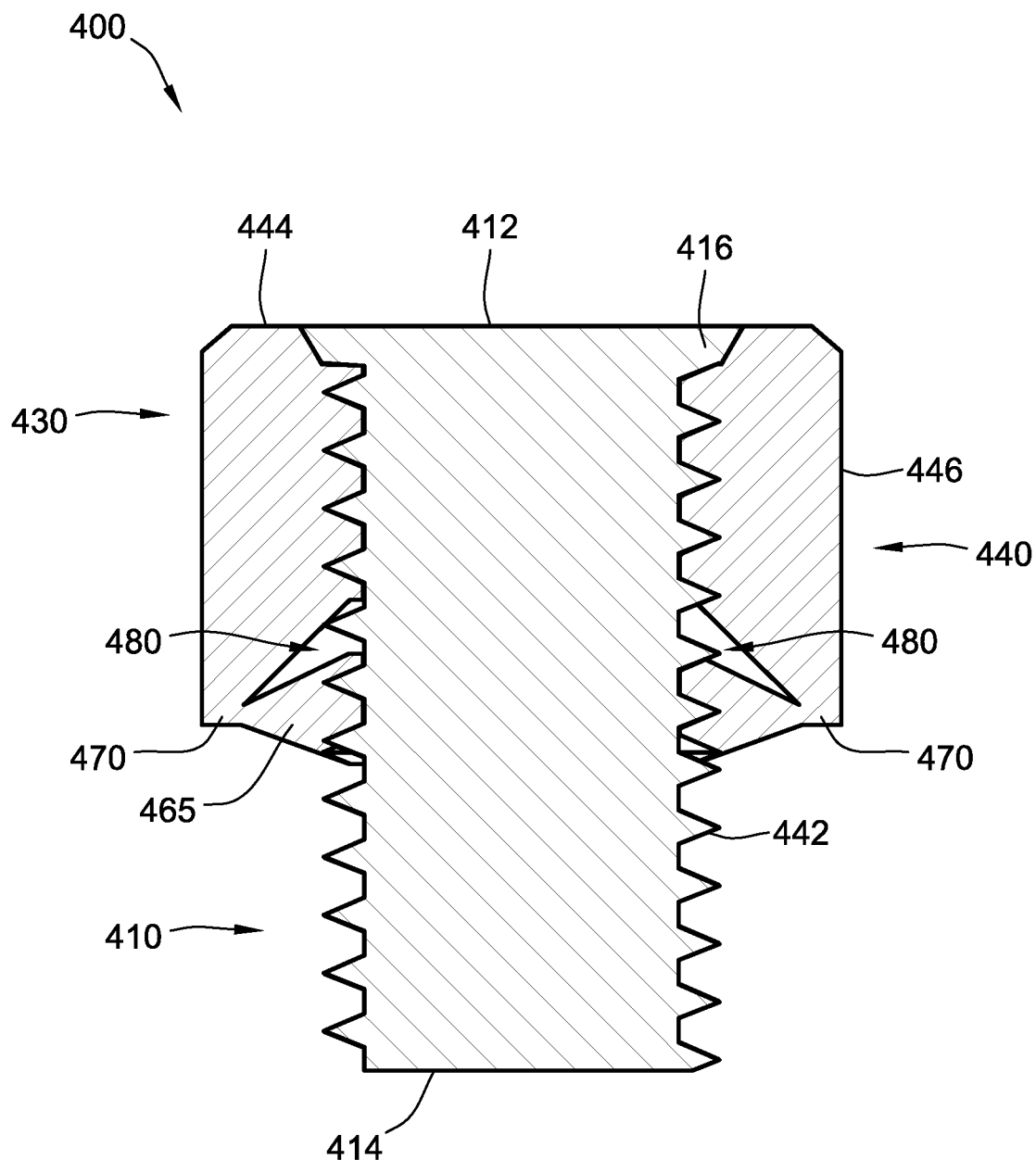
FIG. 5C is an assembled side cross-sectional view of the bolt of FIG. 5A.

Referring generally to FIGS. 4A-5C, a bolt 400 includes a threaded shaft 410 and a bolt head 430. As shown in FIGS. 4A-4C, the bolt 400 is exploded or in a pre-assembled configuration where the threaded shaft 410 is separated from the bolt head 430. As shown in FIGS. 5A-5C, the bolt 400 is an assembled configuration where the bolt head 430 is threadingly coupled to the threaded shaft 410, thereby forming the bolt 400. As shown in FIGS. 6A-6D, the bolt 400 can be used in conjunction with a nut to securely clamp an object.

The threaded shaft 410 is the same as, or similar to, the threaded shaft 110 described above (FIGS. 1A-3B) in that the threaded shaft 410 has a first end 412, a second opposing end 414, a flared protrusion 416, and an external thread 422 wrapped therearound. The flared protrusion 416 is the same as, or similar to, the flared protrusion 116 (FIG. 1C) described above and is received within a back recess 452 (FIG. 4C) of the main body 440 of the bolt head 430 during assembly of the bolt 400 (FIGS. 5A-5D).

The bolt head 430 includes a main body 440 and a deformable body 460. The main body 440 is similar to the bolt head 130 described above (FIGS. 1A-3B) in that the main body 440 includes a front surface 442, an opposing back surface 444, an outer surface 446, a tapered back surface 454, and a tapered front surface 458. The outer surface 446 is sized and shaped such that the main body 440 of the bolt head 430 has a generally hexagonal outer cross-sectional, but other shapes for the other surface 446 are contemplated (e.g., circle, square, oval, triangle, rectangle, polygon, etc., or any combination thereof) such that, as described in further detail below, a tool can engage the main body 440 of the bolt head 430 (e.g., the tool can cause the bolt head 430 to rotate relative to the threaded shaft 410).

The main body 440 is also similar to the bolt head 130 (FIGS. 1A-3B) in that the main body 440 includes an interior threaded bore 448 and a back recess 452. As best shown in FIG. 4C, the back recess 452 is the same as, or similar to, the recess 142 (FIG. 1C) described above and is defined by the tapered back surface 454. Like the tapered back surface 144 (FIG. 1C) described above, the tapered back surface 454 is inwardly tapered from the opposing back surface 444 of the main body 440 towards the front surface 442 and the interior threaded bore 448 by an angle relative to a central axis of the main body 440 (e.g., an angle that is the same as or similar to the second angle $\theta_2$ described above).

The interior threaded bore 448 is sized and shaped to receive at least a portion of the threaded shaft 410 therein and includes an internal thread 450. The internal thread 450 engages the external thread 422 of the threaded shaft 410 during assembly of the bolt 400. As shown, the external thread 422 of the threaded shaft 410 and the internal thread 450 of the main body 440 are each helical. Alternatively, the external thread 422 and/or the internal thread 450 can include continuous or discontinuous thread segments, single or multiple leads or threads, or any combination thereof. Further, while a certain sized thread having a thread pitch and a thread depth is shown, the external thread 422 and/or the internal thread 450zaaa can have any pitch and any depth (e.g., a unified or metric thread, a square thread, an ACME thread, a buttress thread, etc.)

The main body 440 differs from the bolt head 130 (FIGS. 1A-3C) described above in that the main body 440 includes a tapered front surface 458 which defines a front recess 456 (FIG. 4C). The tapered front surface 458 is inwardly tapered from the front surface 442 of the main body 440 towards the opposing back surface 444 and the interior threaded bore 448 by a third angle $\theta_3$ relative to a central axis of the main body 440. As shown, the third angle $\theta_3$ is about 60 degrees. Alternatively, the third angle $\theta_3$ of the tapered front surface 458 can be between about 0 degrees and about 90 degrees. More preferably, the third angle $\theta_3$ of the tapered back surface 144 is between about 45 degrees and about 75 degrees.

The deformable body 460 has a central body portion 465 and an outer flange 470. The central body portion 465 defines an interior threaded bore 468 of the deformable body 460. As best shown in FIG. 4C, the deformable body 460 has a front surface 462, an opposing back surface 464, and an outer surface 466, an inclined front face 472, and an inclined rear face 474. The central body portion 465 is generally defined as the portion of the deformable body 460 that is between the outer flange 470 and the interior threaded bore 468 and between the inclined front face 472 and the inclined rear face 474. As described in further detail below, the central body portion 465 deforms and/or plasticizes during installation and/or assembly of the bolt 400.

The interior threaded bore 468 of the central body portion 456 includes an internal thread 469 (FIG. 4C). The internal thread 469 has the same pitch and depth as the external thread 422 of the threaded shaft 410 such that the deformable body 460 can be readily threaded onto (i.e., screwed on) the threaded shaft 410 of the bolt 400 (e.g., during assembly of the bolt 400).

As best shown in FIG. 4C, the outer flange 470 of the deformable body 460 is relatively thinner than the central body portion 465 such that the outer flange 470 is able to act as a pivot and/or fulcrum point for the central body portion 465 to deform/plasticize about during assembly and/or installation of the bolt 400 in conjunction with the nut 500 and the objects 600a, 600b (FIGS. 6A-6D). In some implementations, the outer flange 470 has a first elastic modulus and the rest of the deformable body 460 has a second elastic module that is greater than the first elastic modulus. In some implementations, the outer flange 470 has a thickness that is between about 10 percent to about 80 percent of the maximum/total height of the deformable body 460. More preferably, the outer flange 470 has a thickness that is between about 15 percent to about 30 percent of the maximum/total height of the deformable body 460.

The deformable body 460 has a general "flying saucer" shape that is formed symmetrically about a transverse plane. As best shown in FIG. 4C, the inclined front face 472 and the inclined rear face 474 are both at angles of α and β, respectively, relative to horizontal and/or relative to the outer flange 470. As shown, the angles α and β are each about one hundred and fifty degrees. Alternative, in some implementations, the angles α and β can be any angle between about ninety degrees and about one hundred and eighty degrees, (e.g., about 90 degrees, about 100 degrees, about 110 degrees, about 120 degrees, about 130 degrees, about 140 degrees, about 150 degrees, about 160 degrees, about 170 degrees, about 180 degrees, etc.). More preferably, each of the angles α and β is between about 100 degrees and about 170 degrees.

As shown, the front recess 456 of the main body 440 and the deformable body 460 define a relief space 480. As described in further detail below, the relief space 480 provides an area for the central body portion 465 of the deformable body 460 to deform into (e.g., elastically flow via plastic deformation) during assembly and/or installation of the bolt 400.

The front surface 462 of the deformable body 460 is the forward-most surface of the bolt head 430 of the bolt 400 that is positioned to engage the objects 600a, 600b (see FIGS. 6A-6D) to be bolted together (e.g., between the bolt head 430 and the nut 500), which limits the axial movement of the deformable body 460 during installation of the bolt 400.

The outer surface 466 of the deformable body 460 and the outer surface 446 of the main body 440 are configured to be engaged by the tool (not shown), in the same fashion as the outer surface 136 of the bolt head 130 described above. As best shown in FIGS. 4A and 4C, the deformable body 460 and the main body 440 each have a generally hexagonal outer cross-section, but other shapes for the outer surface 466 and the outer surface 446 are contemplated such that the tool can engage the bolt head 430 in a non-rotational fashion (e.g., the tool can cause the bolt 400 to rotate relative to a nut, and vice versa).

While the deformable body 460 and the main body 440 are shown as separate components in FIGS. 4A-4C that are fixed together in FIG. 5C, in some implementations, the main body 440 and the deformable body 460 of the bolt head 430 are formed as unitary and/or monolithic components. In such implementations, the generally annular relief space 480 is integrally formed (e.g., machined) within the bolt head 430.

To assemble the bolt 400 from its unassembled or exploded state (FIGS. 4A-4C) into its assembled state (FIG. 5A-5C), the bolt head 430 is threaded onto the second opposing end 414 of the threaded shaft 410 such that the internal thread 450 of the interior threaded bore 448 of the main body and the internal thread 469 of the interior threaded bore 468 of the deformable body 460 engage the external thread 422 of the threaded shaft 410.

As best shown in FIG. 5C, the deformable body 460 is permanently and/or non-rotationally attached/fixed to the main body 440, thereby forming the bolt head 430 (e.g., the deformable body 460 and the main body 440 are unitary and/or monolithic). To attach/fix the main body 440 to the deformable body 460, the deformable body 460 is positioned such that the outer flange 470 abuts the opposing back surface 442 of the main body 440. The outer flange 470 is then fixed to the main body 440 via welding, soldering, gluing, or any combination of attachment methods such that the deformable body 460 and the main body 440 cannot rotate relative to one another. As shown in FIG. 5C, the outer flange 470 extends from the central body portion 465 such that the entirety of the outer surface 446 of the main body is co-planar with the entirety of the outer surface 466 of the deformable body 460. The deformable body 460 can be permanently and/or non-rotationally attached/fixed to the main body 440 to form the bolt head 430 before the bolt head 430 is threaded onto the threaded shaft 410. Alternatively, in some implementations, the main body 440 is threaded onto the second opposing end 414 of the threaded shaft 410, the deformable body 460 is threaded onto the second opposing end 414 such that the outer flange 470 abuts the opposing back surface 442 of the main body 440, and then the deformable body 460 is permanently and/or non-rotationally attached/fixed to the main body 440. In other implementations, the main body 440 is threaded onto the second opposing end 414 of the threaded shaft 410, the deformable body 460 is threaded onto the second opposing end 414 such that the outer flange 470 abuts the opposing back surface 442 of the main body 440, and the deformable body 460 is not permanently and/or non-rotationally attached/fixed to the main body 440.

With the bolt head 430 threaded onto the threaded shaft 410, the bolt head 430 is then rotated (e.g., using a tool that engages the outer surface 446 of the main body 440 and/or the outer surface 466 of the deformable body 460) in a first rotational direction (e.g., clockwise) such that the bolt head 430 translates along the threaded shaft 410 towards the first end 412. Rotation of the bolt head 430 in the first rotational direction continues until the flared protrusion 416 of the threaded shaft 410 is received within the back recess 452 of the main body 440 of the bolt head 430. Contact between the tapered back surface 454 of the back recess 452 and the inclined surface 418 of the flared protrusion 416 prevents further translation of the bolt head 430 towards the first end 412 of the threaded shaft 410.

In some implementations, assembly of the bolt 400 further includes permanently and/or non-rotationally attaching/fixing the bolt head 430 to the threaded shaft 410 via welding, soldering, gluing, sonic-welding, or any combination of attachment mechanisms such that the bolt head 430 and threaded shaft 410 cannot rotate (e.g., about the central axis of the threaded shaft 410) relative to one another. For example, the bolt head 430 can be welded to the first end 412 of the threaded shaft 410 by placing a coil (not shown) on the first end 412 of the threaded shaft 410 and/or the opposing back surface 444 of the main body 440 of the bolt head 430 and heat welding the threaded shaft 410 to the bolt head 430. In another example, an adhesive (e.g., friction bearing sealer) is applied to the threaded shaft 410 (e.g., the external thread 422, the flared protrusion 416, or both), the bolt head 430 (e.g., the back recess 452 and/or the interior threaded bore 456), or both prior to or during the threading of the bolt head 430 onto the threaded shaft 410.

Referring to FIGS. 6A-6D, a method of securing the bolt 400 with a nut 500 to objects 600a, 600b is described. The nut 500 is the same as, or similar to, the bolt head 430 and includes a front surface 502 that is the same as, or similar to, the opposing back surface 444 of the main body 440 of the bolt head 430, an opposing back surface 504 that is the same as or similar to the front surface 442 of the main body 440 of the bolt head 430, and an outer surface 506 that is the same as or similar to the outer surface 446 and outer surface 466 described above. The nut 500 also includes a relief space 580 that is the same as or similar to the relief space 480 described above (FIG. 4D). The nut 500 differs from the bolt head 430 in that it does not include a front recess. Alternatively, the nut 500 can be a conventional nut that is the same as or similar to the nut 200 shown in FIGS. 3A and 3B.

Figure 6A:
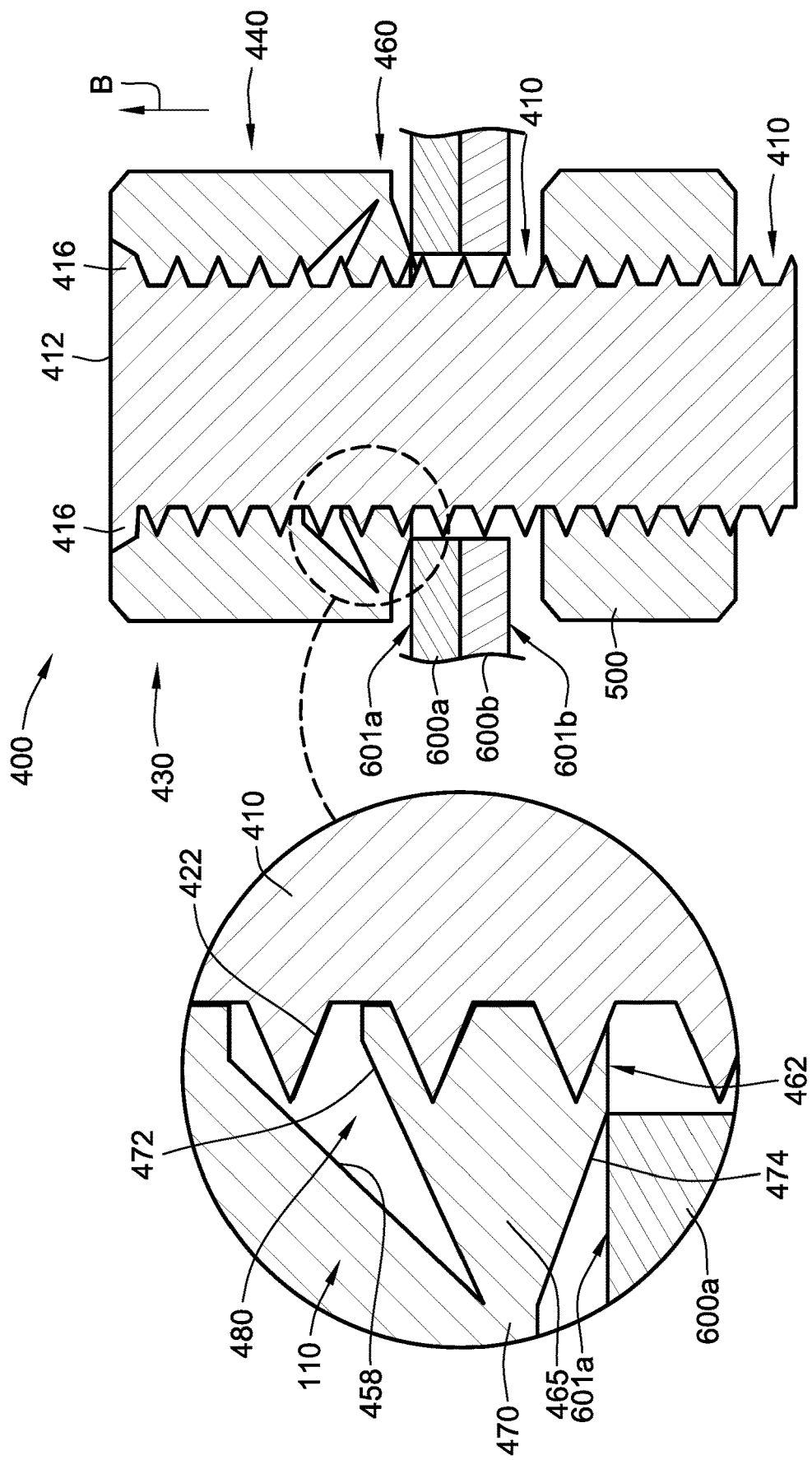
FIG. 6A is a front cross-sectional view of the bolt of FIG. 5A loosely positioned through an object and loosely threadingly engaged with a nut prior to the nut being torqued according to some implementations of the present disclosure.

Initially, as shown in FIG. 6A, the threaded shaft 410 of the bolt 400 is positioned through an opening in objects 600a, 600b such that a portion of the threaded shaft 410 protrudes from the opening and the surface 601a of the object 600 contacts (e.g., abuts) the front surface 462 of the deformable body 460 of the bolt head 430. Then, the nut 500 is threaded onto the portion of the threaded shaft 410 protruding from the opening by rotating the nut 500 in a first rotational direction (as shown in FIGS. 6A-6D as being clockwise, but could be counterclockwise in other implementations). This rotation of the nut 500 causes the nut 500 to move axially in the direction of arrow B towards a surface 601b of the object 600b and towards the bolt head 430 of the bolt 400.

Figure 6B:
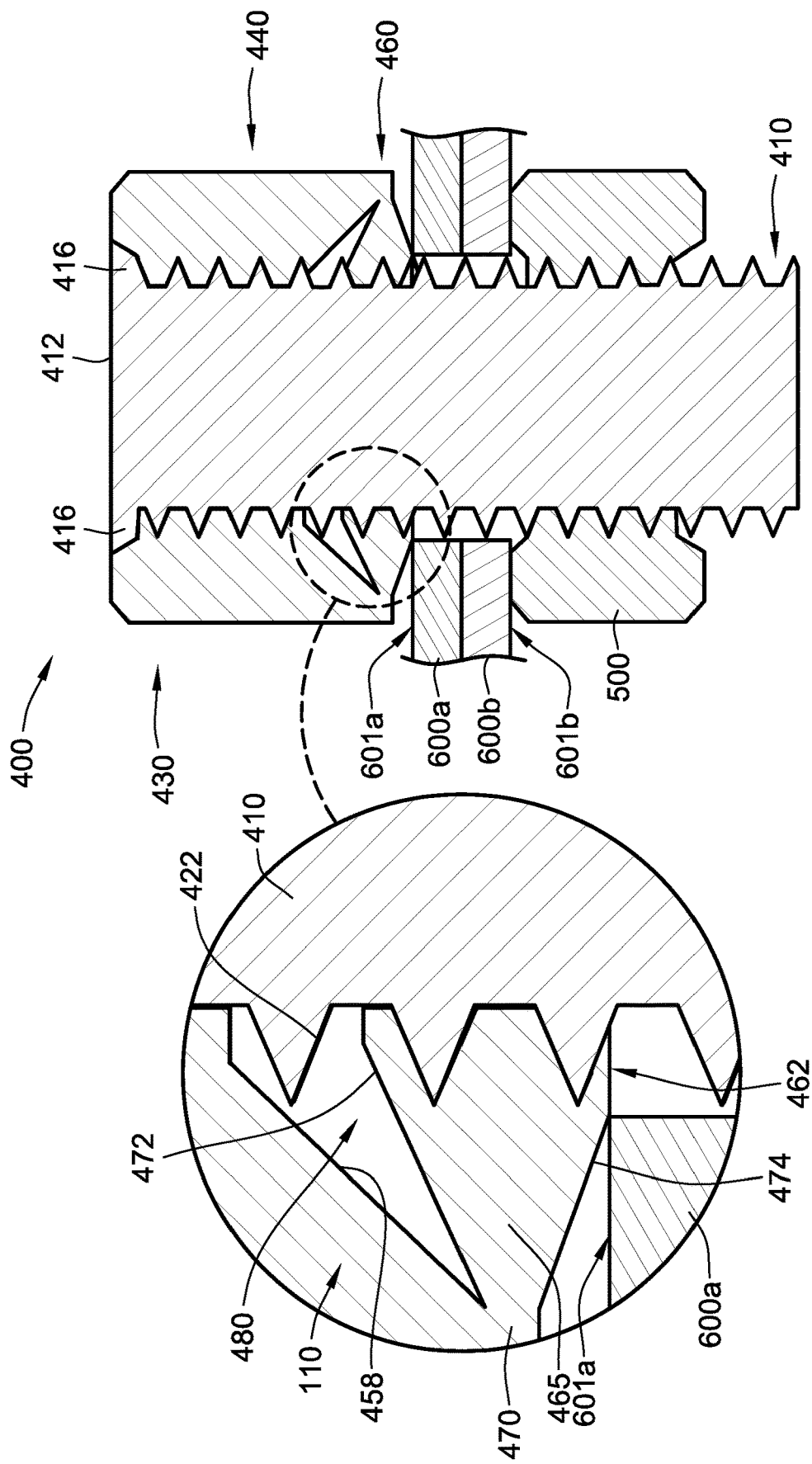
FIG. 6B is a front cross-sectional view of the bolt of FIG. 6A threadingly engaged with the nut such that the object is secured therebetween and prior to the nut being torqued according to some implementations of the present disclosure.

Referring to FIG. 6B, the nut 500 is continued to be rotated on the portion of the threaded shaft 410 until the front surface 502 of the nut 500 abuts and/or first contacts the surface 601b of the object 600b (FIG. 6B). As the nut 500 continues to be rotated in a clockwise direction, the surface 601a of the object 600 contacts the front surface 462 of the deformable body 460 of the bolt head 430 such that the deformable body 460 of the bolt head 430 abuts and/or is snug against the surface 601a of the object 600a and the nut 500 abuts and/or is snug against the surface 601b of the object 600b as shown in FIG. 6B (i.e., prior to torqueing).

Then, rotational torque is applied to the bolt head 430 of the bolt 400 and/or the nut 500 (e.g., using one or more tools and/or one or more torque wrenches). In some implementations, the bolt head 430 of the bolt 400 is held generally stationary (e.g., via a tool) and a rotational torque is applied to the nut 500 in a rotational direction (e.g., clockwise), thereby torqueing the bolt 400. In other implementations, the nut 500 is generally held stationary (e.g., via a tool) and a rotational torque is applied to the bolt head 430 of the bolt 400 in a rotational direction (e.g., counterclockwise), thereby torqueing the bolt 400. In yet some other implementations, a first rotational torque is applied to the nut 500 in a first rotational direction (e.g., clockwise) and a second rotational torque is applied to the bolt 400 in a second rotational direction (e.g., counterclockwise), thereby torqueing the bolt/nut fastener. The torqueing of the bolt 400 causes both a torsional (rotational) force and an axial (clamping) force in the direction of arrow A on the bolt 400.

Figure 6C:
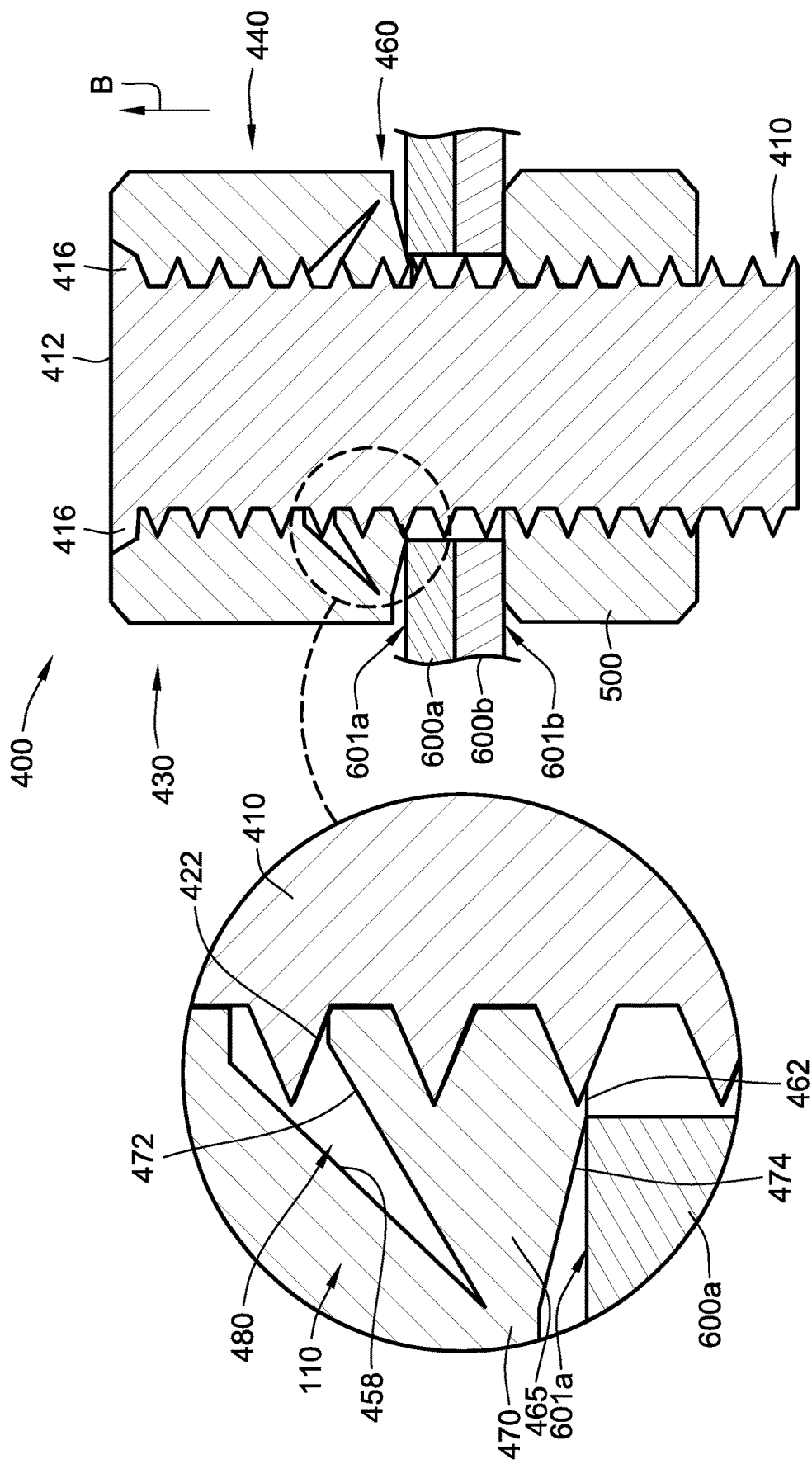
FIG. 6C is a front cross-sectional view of the bolt of FIG. 6A threadingly engaged with the nut after the nut is partially torqued such that a deformable-bolt head component of the bolt begins to deform.

As shown by a comparison of FIGS. 6B and 6C, the torqueing described above causes the deformable body 460 to move axially in the direction of arrow B and causes a portion of the deformable body 460 to deform (e.g., the central body 455 deforms, the outer flange 470 deforms, or both). Further, as shown by a comparison of FIGS. 6C and 6D, the deformable body 460 deformed even more with more of the deformable body 460 entered into the relief space 480. As the deformable body 460 of the bolt head 430 deforms, a portion of the deformable body (e.g., a portion of the central body 455, a portion of the outer flange 470, or both) enters the relief space 480 formed between the deformable body 460 and the main body 440 of the bolt head 430. The surface 601a impedes the deformable body 460 from moving in the direction of arrow B, which results in the front surface 462 and/or the inclined rear surface 474 flattening out, which can be seen by comparing FIG. 6B (prior to torqueing and not flattened) with FIG. 6D (after torqueing and flattened). In some implementations, the inclined front face 474 flattens out, changing the angle α from about 150 degrees to about 180 degrees (e.g., such that the inclined front face 474 is co-planar or flush with the outer flange 470).

Generally, when the bolt 400 is installed, the deformable body 460 of the bolt head 430 locks and compresses into the front recess 456 of the main body 440 of the bolt head 430, thereby (i) reinforcing and strengthening the coupling between the bolt head 430 and the threaded shaft 410, (ii) redirected torsional and press forces to the opposing back surface 444 of the main body 440 of the bolt head 430 for a wider load distribution, and (iii) absorbing torsional strain energy caused by torqueing of the bolt head 430 and/or the nut 500. More specifically, the torqueing of the bolt 400 described above causes (i) a torsional (rotational) force and (ii) an axial (e.g., clamping) force on the bolt 400.

The torsional force is distributed towards the opposing back surface 444 of the main body 440 of the bolt head 430. The torsional stress experienced by the bolt 400 as a result of this torsional force is proportional to the diameter of the bolt 400. As described above, the diameter of the bolt head 430 is greater than the diameter of the threaded shaft 410 (e.g., the outer diameter of the bolt head 430 is twice the outer diameter of the threaded shaft 410). Thus, advantageously, when the torsional force is distributed towards the opposing back surface 444 of the main body 440 of the bolt head 430 (e.g., as opposing to being distributed on the threaded shaft 410), the torsional force is distributed over a wider area, which reduces the torsional stress experienced by the bolt 400. In this manner, the torsional stress experienced by the bolt 400 for a given torsional force is reduced relative to the torsional stress experienced by a standard bolt in which the torsional force is distributed at a junction between its threaded shaft and bolt head.

Similarly, torqueing of the bolt 400 causes the axial force to be applied to the bolt head 130 in the direction of arrow B. This axial force is transferred from the bolt head 430 to the threaded shaft 410. More specifically, the bolt head 430 carries the axial force on the internal thread 450 of the main body and the internal thread 469 of the deformable body 460, which exerts an axial force along the corresponding external thread 422 of the threaded shaft 410 to which each is threadingly coupled. The stress caused by the axial force is distributed along an axial length of the threaded shaft 410, meaning that the axial stress at any given point along the threaded shaft 410 is reduced. Accordingly, the failure point of the bolt 400 corresponds to the axial strength of the threaded shaft 410 (i.e., how much the threaded shaft 410 can be strained/stretched before failure).

Advantageously, as compared to the bolt 100 described above, the deforming and/or plasticizing of the central body portion 465 into the relief space 480 aids in absorbing torsional strain energy caused by the torqueing of the bolt 400, the nut 500, or both.

In some implementations, the threaded shaft 410 of the bolt 400 does not include the flared protrusion 416 (FIG. 4C). Instead, the external thread 422 extends between the opposing second end 414 to the first end 412 of the threaded shaft 410. In such implementations, during assembly of the bolt 400, the bolt head 430 is threaded onto the threaded shaft 410 as described above until the opposing back surface 444 of the main body 440 is about co-planar and/or coincident with (e.g., flush) the first end 412 of the threaded shaft 410 (e.g., similar to as shown in FIG. 5B). Then, the bolt 430 is held generally stationary (e.g., using a tool) such that the bolt head 430 cannot rotate relative to the threaded shaft 410 and continue beyond the first end 412 of the threaded shaft 410 (i.e., the opposing back surface 444 of the main body 440 of the bolt head 430 remains flush with the first end 412 of the threaded shaft 410).

Then, the bolt head 430 can be permanently and/or non-rotationally attached/fixed to the threaded shaft 410, thereby forming the bolt 400 using a variety of mechanisms such as via welding, soldering, gluing, sonic-welding, or any combination of attachment mechanisms. In some implementations, the bolt head 430 can be permanently and/or non-rotationally attached/fixed to the threaded shaft 410 by deforming and/or plasticizing of the central body portion 465 of the deformable body 460 into at least a portion of the relief space 480 using one or more assembly tools (not shown). For example, the one or more assembly tools can include a pair of pillars or a vice that compresses the bolt head 430 such that the central body portion 465 of the deformable body 460 deforms and/or plasticizes into at least a portion of the relief space 480. In another example, assembly of the bolt 400 includes use of the objects 600a, 600b and the nut 500 as the one or more assembly tools to deform the central body portion 465 into at least a portion of the relief space 480 as described above and shown in FIG.

6C. The nut 500 and objects 600*a*, 600*b* can then be removed after the desired deformation is achieved, completing assembly of the bolt 400.

For example, the central body portion 465 can be deformed until it fills at least about 10% of the relief space 480, at least about 20 percent of the relief space 480, at least about 30 percent of the relief space 480, at least about 40 percent of the relief space 480, at least about 50 percent of the relief space 480, at least about 60 percent of the relief space 480, at least about 70 percent of the relief space 480, at least about 80 percent of the relief space 480, at least about 90 percent of the relief space 480, or about 100 percent of the relief space 480. This deformation aids in permanently and/or non-rotationally attaching/fixing the bolt head 430 to the threaded shaft 410 during assembly. Deforming the central body portion 465 such that it fills less than 100 percent of the relief space 480 during assembly permits the central body portion 465 to deform and/or plasticize further into the relief space during installation of the bolt 400, thereby aiding in absorbing torsional strain energy during installation as described above.

In other implementations, the threaded shaft 410 of the bolt 400 does not include the flared protrusion 416 (FIG. 4C) such that the external thread 422 extends between the opposing second end 414 to the first end 412 of the threaded shaft 410, and the bolt head 430 is inverted prior to threading the bolt head 430 onto the threaded shaft 410 during assembly (FIGS. 5A-5C). In such implementations, the bolt head 430 is threaded onto the threaded shaft 410 until the front surface 462 of the deformable body is co-planar or coincident with (e.g., flush) the first end 412 of the threaded shaft 410. Then, the deformable body 460 of the bolt head 430 is held generally stationary (e.g., using a tool or by welding the deformable body 460 to the threaded shaft 410) such that the deformable body 460 cannot rotate relative to the threaded shaft 410 and continue beyond the first end 412 of the threaded shaft 410 (i.e., the tapered front surface 458 of the main body 440 of the bolt head 430 remains flush with the first end 412 of the threaded shaft 410).

Figure 6D:
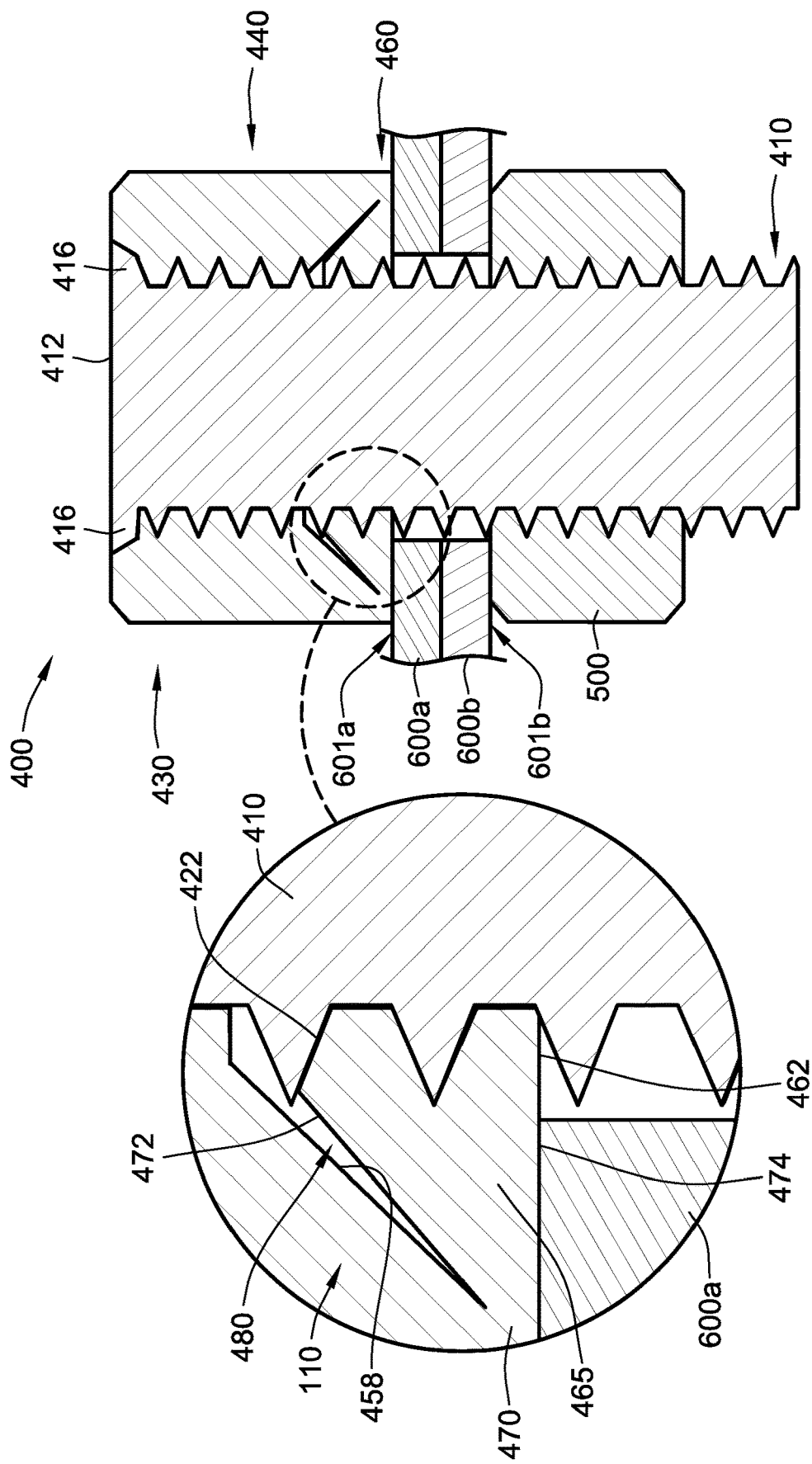
FIG. 6D is a front cross-sectional view of the bolt of FIG. 6A threadingly engaged with the nut after the nut is fully torqued such that the deformable-bolt head component of the bolt is further deformed.

Then, the bolt head 430 is permanently and/or non-rotationally attached/fixed to the threaded shaft 410 by deforming and/or plasticizing of the central body portion 465 of the deformable body 460 into at least a portion of the relief space 480 by torqueing (e.g., using a tool) the main body 440 relative to the threaded shaft 410. This deformation aids in permanently and/or non-rotationally attaching/fixing the bolt head 430 to the threaded shaft 410 during assembly. Then, prior to installation, in some implementations, a second deformable body (not shown) that is the same as, or similar to, the deformable body 460 is threaded onto the threaded shaft 410 until an opposing rear surface of the second deformable body contacts (e.g., abuts) the opposing back surface 444 of the main body 440 (FIG. 4C), thereby defining a second relief space between the main body 440 and the second deformable body. During installation of the bolt (e.g., with the objects 600*a*, 600*b* and nut 500 as shown in FIGS. 6A-6D), the second deformable body deforms into the second relief as described above (FIGS. 6B and 6C), thereby aiding in absorbing torsional strain during installation of the bolt.

In some implementations, the nut 200 (FIGS. 3A and 3B) and/or the nut 500 (FIGS. 6A-6D) can be the same as, or similar to, the bolt head 430 (FIGS. 4A-4C) described above in that the nut 200 and/or the nut 500 include a relief space that is the same as or similar to the relief space 480 (FIG. 5C). In such implementations, the nut 200 and/or nut 500 includes a deformable body that is the same as, or similar to, the deformable body 460 described above. Deformation of the central body of the nut 200 and/or nut 500 into a relief space during installation of the bolts 100, 400 aids in permanently and/or non-rotationally attaching/fixing the nut 200 to the threaded shaft 110 and/or the nut 500 to the threaded shaft 410 during installation of the bolts 100, 400.

The bolts 100, 400 of the present disclosure perform better than a standard bolt (e.g., a bolt without a deformable-bolt head component as described herein). Specifically, the bolts 100, 400 can be torqued, without shearing or popping off its head, to a relatively higher value as compared to a standard bolt without the deformable-bolt head component. For example, in some such implementations, the bolts 100, 400 of the present disclosure can be torqued at least about twenty-five percent more as compared with a standard bolt having a similar nominal size. In some other implementations, the bolts 100, 400 of the present disclosure can be torqued at least about fifty percent more as compared with a standard bolt having a similar nominal size. In some other implementations, the bolts 100, 400 of the present disclosure can be torqued at least about one hundred percent more (i.e., twice the torque) as compared with a standard bolt having a similar nominal size. Such a relatively higher torque results in a correspondingly higher maximum applied clamp load of the bolt as compared with a standard bolt.

It is to be understood that many modifications and variations may be devised given the above description of the general principles of the present disclosure. It is intended that all such modifications and variations be considered as within the spirit and scope of the present disclosure, as defined in the following claims.

What is claimed is:

1. A method for making a bolt, the method comprising:
   providing a shaft having a first end and a second opposing end;
   forming a flared protrusion at the first end of the shaft;
   forming a thread on the shaft such that the thread extends from the second end to the flared protrusion;
   threadingly engaging a bolt head onto the thread of the shaft at the second opposing end of the shaft, the bolt head including (i) an interior threaded bore, (ii) a front surface, and (iii) an opposing back surface having a recess;
   rotating the bolt head relative to the shaft such that bolt head translates along the shaft towards the first end;
   continuing to rotate the bolt head until the flared protrusion formed in the shaft is received within the recess of the bolt head, thereby forming the bolt; and
   fixing the bolt head to the shaft such that the bolt head is prevented from rotating relative to the shaft,
   wherein at least a portion of the shaft including the thread extends beyond the bolt head after the forming the bolt.

2. The method of claim 1, wherein the bolt head is rotated until an upper surface of the flared protrusion is substantially flush with the opposing back surface of the bolt head.

3. The method of claim 1, wherein the fixing the bolt head to the shaft includes welding at least a portion of the bolt head to at least a portion of shaft subsequent to the flared protrusion being received within the recess of the bolt head.

4. The method of claim 1, wherein the fixing includes applying an adhesive to (a) at least a portion of the thread of the shaft, (b) at least a portion of the interior threaded bore of the bolt head, or (c) both, prior to the flared protrusion being received within the recess of the bolt head.

5. The method of claim 1, wherein the recess of the bolt head has an inner surface that is tapered inwardly towards a central axis of the bolt head from the opposing back surface of the bolt head towards the front surface.

6. A method of making a bolt, the method comprising:
providing a shaft having a first end and a second opposing end;
forming a flared protrusion at the first end of the threaded shaft;
forming a thread on the shaft such that the thread extends from the second end to the flared protrusion;
threadingly engaging a bolt head onto the thread of the shaft at the second opposing end of the shaft, the bolt head including a main body, a deformable body, and a relief space formed between a first recess of the main body and a flared end of the deformable body;
rotating the bolt head relative to the shaft such that the bolt head translates along the shaft towards the first end; and
continuing to rotate the bolt head until the flared protrusion formed in the shaft is received within a second recess formed in a back surface of the main body of the bolt head.

7. The method of claim 6, wherein the bolt head is rotated until an upper surface of the flared protrusion is flush with the back surface of the main body of the bolt head.

8. The method of claim 6, further comprising fixing the bolt head to the shaft such that the bolt head is prevented from rotating relative to the threaded shaft.

9. The method of claim 8, wherein the fixing the bolt head to the shaft includes welding the back surface of the main body of the bolt head to the flared protrusion of the threaded shaft.

10. The method of claim 8, wherein the fixing the bolt head to the shaft includes deforming at least a portion of the deformable body into the relief space formed between the deformable body and the main body, thereby aiding in preventing the bolt head from rotating relative to the shaft.

11. The method of claim 8, wherein the fixing includes applying an adhesive to (i) at least a portion of the shaft, (ii) at least a portion of an interior threaded bore of the main body, (iii) at least a portion of an interior threaded bore of the deformable body, or (iv) any combination thereof, wherein the adhesive aids in preventing the bolt head from rotating relative to the shaft subsequent to the flared protrusion being received within the second recess.

12. A method of securing a bolt to an object with a nut, the bolt comprising a threaded shaft and a bolt head having a main body and a deformable body, the method comprising:
positioning the threaded shaft through an opening in the object such that a portion of the threaded shaft protrudes from the opening;
threading the nut onto the portion of the threaded shaft protruding from the opening by rotating the nut in a first rotational direction, thereby causing the nut to move axially in a first direction towards a first surface of the object;
causing a front surface of the nut to abut the first surface of the object and causing a front surface of the deformable body of the bolt head to abut a second opposing surface of the object by:
(i) continuing to thread the nut onto the portion of the threaded shaft;
(ii) rotating the bolt in a second opposing rotational direction, or
(iii) a combination of (i) and (ii);
with the front surface of the nut abutting the first surface of the object and with the front surface of the deformable body abutting the second opposing surface of the object:
(a) applying a first rotational torque in the first rotational direction to the nut;
(b) applying a second rotational torque in the second rotational direction to the bolt, or
(c) a combination of (a) and (b);
the application of the first rotational torque, the application of the second rotational torque, or the application of both the first and second rotational torques causing the deformable body to deform, thereby entering at least a portion of a relief space formed between the deformable body and the main body of the bolt head.

13. The method of claim 12, wherein the bolt head aids in redistributing stress caused by the application of the first rotational torque, the application of the second rotational torque, or the application of the first and the second rotational torque along an axial length of the threaded shaft.

14. The method of claim 12, wherein the relief space aids in absorbing torsional strain energy caused by the application of the first rotational torque, the application of the second rotational torque, or the application of the first and the second rotational torque.

15. The method of claim 12, wherein the deformation of the deformable body into the relief space aids in preventing rotation of the bolt head relative to the threaded shaft.

16. The method of claim 12, wherein the nut includes a second main body coupled to a deformable body such that a second relief space is formed between the second main body and the second deformable body.

17. The method of claim 16, wherein the application of the first rotational torque, the application of the second rotational torque, or the application of both the first and second rotational torques causing the second deformable body to deform, thereby entering at least a portion of the second relief space formed between the second deformable body and the second main body of the nut.

18. The method of claim 17, wherein the second relief space aids in absorbing torsional strain energy caused by the application of the first rotational torque, the application of the second rotational torque, or the application of the first and the second rotational torque.

19. The method of claim 17, wherein the deformation of the second deformable body into the second relief space aids in preventing rotation of the nut relative to the threaded shaft of the bolt.

* * * * *